United States Patent
Saito

(10) Patent No.: US 9,288,478 B2
(45) Date of Patent: Mar. 15, 2016

(54) IMAGE PICKUP APPARATUS THAT DETERMINES SHOOTING COMPOSITION, METHOD OF CONTROLLING THE SAME, AND STORAGE MEDIUM

(75) Inventor: Makiko Saito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 426 days.

(21) Appl. No.: 13/824,049

(22) PCT Filed: Dec. 9, 2011

(86) PCT No.: PCT/JP2011/079111
§ 371 (c)(1),
(2), (4) Date: Mar. 15, 2013

(87) PCT Pub. No.: WO2012/081684
PCT Pub. Date: Jun. 21, 2012

(65) Prior Publication Data
US 2013/0169757 A1  Jul. 4, 2013

(30) Foreign Application Priority Data
Dec. 14, 2010 (JP) ................................ 2010-278298

(51) Int. Cl.
*H04N 13/02* (2006.01)
*H04N 5/3745* (2011.01)

(52) U.S. Cl.
CPC ....... *H04N 13/0296* (2013.01); *H04N 5/37457* (2013.01); *H04N 13/0232* (2013.01)

(58) Field of Classification Search
USPC ......................................................... 348/46
See application file for complete search history.

(56) References Cited

U.S. PATENT DOCUMENTS 6,486,910 B1 * 11/2002 Kaneda et al. ............ 348/208.99
2002/0176708 A1 * 11/2002 Irie .................................. 396/51
(Continued)

FOREIGN PATENT DOCUMENTS

JP   58-024105 A   2/1983
JP   2007-325139 A   12/2007
(Continued)

OTHER PUBLICATIONS

The above references No. 3 and 4 were cited in the International Search Report dated Jan. 31, 2012 of the corresponding International Application, PCT/JP2011/079111 dated Dec. 9, 2011, which is enclosed.

*Primary Examiner* — Tracy Li
(74) *Attorney, Agent, or Firm* — Cowan, Liebowitz & Latman, P.C.

(57) ABSTRACT

An image pickup apparatus capable of generating image signals for viewing images shot in a composition (vertical or horizontal) intended by a photographer as a three-dimensional image. The apparatus has an image pickup device for converting an optical image to a picked-up image signal as an electric signal. The device includes a plurality of unit pixels, each of which has a plurality of photo diodes for converting the optical image to the picked-up image signal. When an image pickup operation is performed, a posture of the image pickup apparatus is determined, and the plurality of photo diodes in each unit pixel are grouped into a plurality of photo diode groups according to a result of the determination. A plurality of image signals are generated from picked-up image signals output from the photo diode groups, respectively.

11 Claims, 18 Drawing Sheets

(56) References Cited

U.S. PATENT DOCUMENTS

2009/0295964 A1* 12/2009 Utagawa et al. ............ 348/302
2011/0074928 A1* 3/2011 Misawa ........................ 348/47

FOREIGN PATENT DOCUMENTS

| JP | 2009-165115 A | 7/2009 |
| JP | 2010-268443 A | 11/2010 |

* cited by examiner

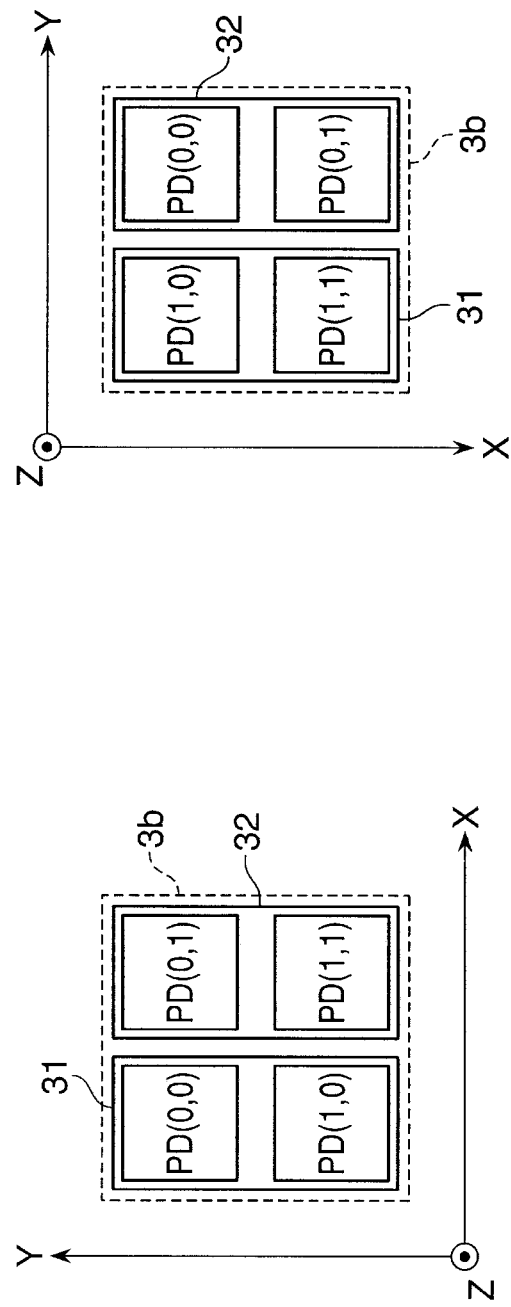

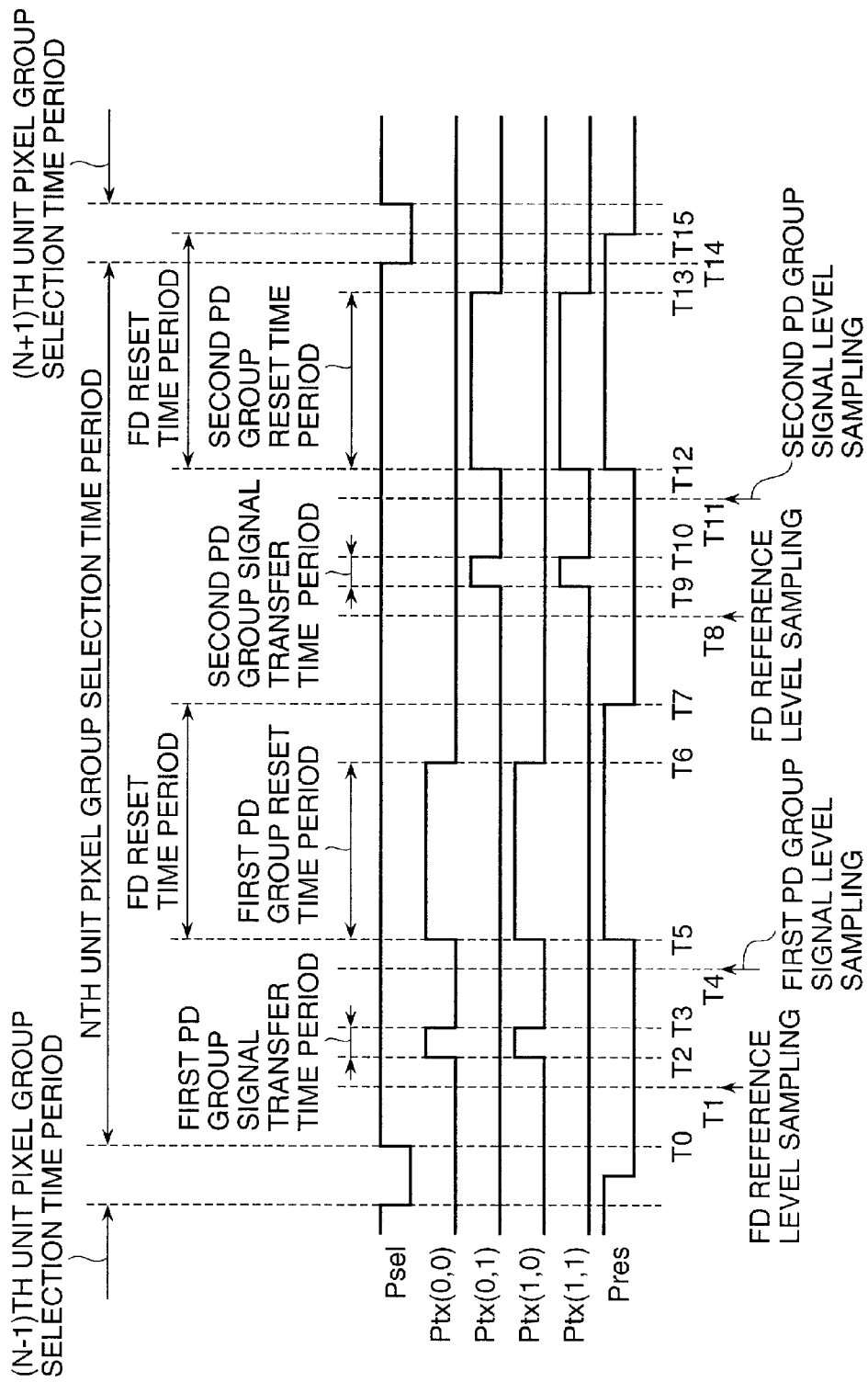

HORIZONTAL COMPOSITION

VERTICAL COMPOSITION

FIG. 8A
FIRST IMAGE SIGNAL
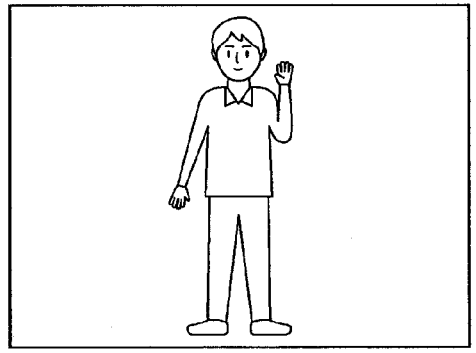
SECOND IMAGE SIGNAL
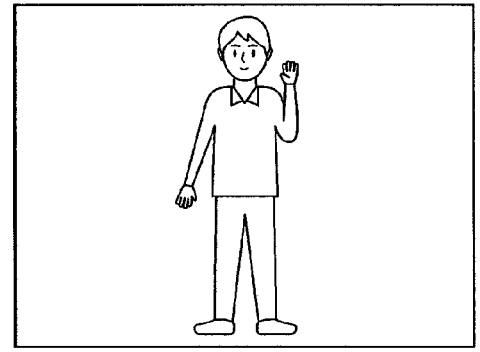
FIG. 8B
FIRST IMAGE SIGNAL
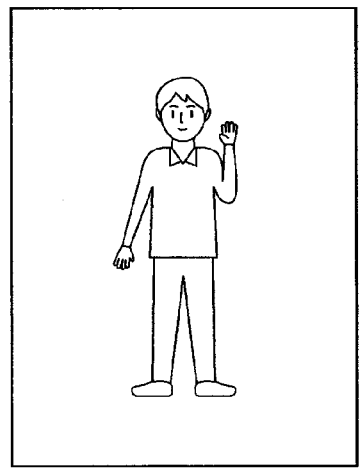
SECOND IMAGE SIGNAL
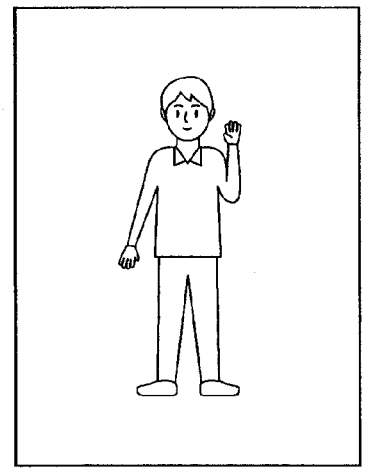

IMAGE PICKUP APPARATUS THAT DETERMINES SHOOTING COMPOSITION, METHOD OF CONTROLLING THE SAME, AND STORAGE MEDIUM

TECHNICAL FIELD

The present invention relates to an image pickup apparatus, a method of controlling the same, and a storage medium, and more particularly to generation of an image signal according to a shooting composition (posture of the image pickup apparatus during a shooting operation) in the image pickup apparatus.

BACKGROUND ART

Recently, three-dimensional screen images and three-dimensional screen image-related apparatuses, such as 3D cinemas and 3D displays, have rapidly come into widespread use. Although shooting of a three-dimensional screen image has also conventionally been performed by a film camera or the like, along with widespread use of a digital image pickup apparatus, such as a digital camera or a digital video camera, images from which a three-dimensional image is produced also have come to be shot using the digital image pickup apparatus.

In a mechanism used for viewing a three-dimensional screen image, a "right-eye image" and a "left-eye image" having parallax in the horizontal direction are prepared such that the prepared images correspond to respective images of an object to be viewed (target object) as viewed with a right eye and a left eye, respectively. Then, the "right-eye image" and the "left-eye image" are viewed with a right eye and a left eye of a viewer, respectively.

As a technique used for this mechanism, there has been known a technique in which an image to be viewed is subjected to parallax division e.g. by a so-called parallax barrier method or a lenticular method. Further, there has also been known a technique of causing different images to enter a left eye and a right eye, respectively, through left and right filters different in characteristics therebetween.

On the other hand, as a technique of shooting images which can be viewed as a three-dimensional screen image, there has been known a technique of simultaneously shooting images from different viewpoints.

For example, there has been proposed a technique in which a plurality of micro lenses are formed on a solid-state image pickup device, and at least one pair of photo diodes is disposed at a location close to each of the micro lenses (see e.g. PTL 1). In this technique, a first image signal is obtained from an output from one photo diode of a photo diode pair, and further, a second image signal is obtained from an output from the other photo diode of the photo diode pair. Then, the first and second image signals are used as the "left-eye image" and the "right-eye image", respectively, so as to view a three-dimensional image.

Similarly, there has been proposed a technique in which a plurality of micro lenses are formed on a solid-state image pickup device, and a plurality of photo diodes are disposed for each of the micro lenses (see e.g. PTL 2). In this technique, the plurality of photo diodes which are arranged in association with one micro lens are connected with each other via gates, and addition or non-addition of signals from the photo diodes arranged at adjacent locations is controlled.

In PTL 2, a picked-up image signal and a focus detection signal of the image pickup apparatus are obtained using the above-mentioned solid-state image pickup device, and hence during normal shooting, an image signal is generated by adding signals output from all of the photo diodes. To obtain signals having a parallax in the horizontal direction, photo diodes adjacent in the vertical direction are connected with each other, whereas to obtain signals having a parallax in the vertical direction, photo diodes adjacent in the horizontal direction are connected with each other. Then, according to an object image, focus detection is performed using a combination of added signals output from the photo diodes which is appropriate to focus detection of the object image.

CITATION LIST

Patent Literature

PTL 1: Japanese Laid-open patent publication No. S58-24105
PTL 2: Japanese Laid-open patent publication No. 2007-325139

SUMMARY OF INVENTION

Technical Problem

By the way, in general, an image signal generated by the image pickup apparatus is printed out as an image on a medium, such as paper, or is displayed on a display device, such as a television, a monitor, or a projector.

Now, a description will be given of viewing of a photograph shot by an image pickup apparatus, such as a digital camera or a digital single-lens reflex camera.

When shooting a photograph using a format having different vertical and horizontal lengths, in general, a photographer selectively uses a vertical composition in which a photograph is shot with a camera in a vertical posture and a horizontal composition in which a photograph is shot with the camera in a horizontal posture, according to an intension of shooting. Therefore, when a shot photograph is displayed, it is preferable to display the photograph in a composition (vertical or horizontal) which is intended by the photographer. This naturally applies to viewing of a three-dimensional screen image.

In viewing three-dimensional screen images, as mentioned above, it is necessary to view images having a parallax in the horizontal direction using the respective eyes associated therewith. For this reason, it is necessary to prepare an image for viewing with a left eye and an image for viewing with a right eye.

In the above-described conventional techniques (PTL1 and PTL2), a plurality of picked-up image signals which can be displayed as a three-dimensional screen image are obtained using the solid-state image pickup device having the micro lenses and the photo diodes. However, in this technique, even if a "left-eye image" and a "right-eye image" can be obtained, these images sometimes have a parallax in a direction which is unsuitable for display in the composition intended by the photographer.

In other words, in the conventional technique (PTL1), the direction of parallax of shot images is determined according to how each pair of photo diodes are arranged in designing the image pickup apparatus.

Further, in the conventional technique (PTL2), the direction of parallax of the shot images have is determined depending on a combination of added signals from the photo diodes selected according to an object image. That is, in this technique, the direction of the parallax of the plurality of images is determined regardless of the composition selected by the photographer.

In a case where the direction of parallax is unsuitable for display of images in the composition intended by the photographer, if the photographer attempts to display the images in the composition intended by the photographer, the parallax of two images is not e.g. in the horizontal direction intended by the photographer, but in the vertical direction, which prevents the images from being viewed as a three-dimensional image.

The present invention provides an image pickup apparatus capable of generating image signals for viewing images shot in a composition (vertical or horizontal) intended by a photographer as a three-dimensional image, a method of controlling the image pickup apparatus, and a storage medium.

Solution to Problem

Accordingly, in a first aspect of the present invention, there is provided an image pickup apparatus that has an image pickup device for converting an optical image to a picked-up image signal which is an electric signal, the image pickup device including a plurality of unit pixels, each of which has a plurality of photoelectric conversion elements for converting the optical image to the picked-up image signal, comprising a determination unit configured to determine a posture of the image pickup apparatus when an image pickup operation is performed by the image pickup apparatus, a grouping unit configured to group the plurality of photoelectric conversion elements in each unit pixel into a plurality of photoelectric conversion element groups according to a result of determination by the determination unit, and a generation unit configured to generate a plurality of image signals from picked-up image signals output from the photoelectric conversion element groups, respectively.

Accordingly, in a second aspect of the present invention, there is provided a method of controlling an image pickup apparatus that has an image pickup device for converting an optical image to a picked-up image signal which is an electric signal, the image pickup device including a plurality of unit pixels, each of which has a plurality of photoelectric conversion elements for converting the optical image to the picked-up image signal, comprising determining a posture of the image pickup apparatus when an image pickup operation is performed by the image pickup apparatus, grouping the plurality of photoelectric conversion elements in each unit pixel into a plurality of photoelectric conversion element groups according to a result of the determining, and generating a plurality of image signals from picked-up image signals output from the photoelectric conversion element groups, respectively.

Accordingly, in a third aspect of the present invention, there is provided a non-transitory computer-readable storage medium storing a computer-executable program for causing a computer included in an image pickup apparatus to execute a method of controlling the image pickup apparatus that has an image pickup device for converting an optical image to a picked-up image signal which is an electric signal, the image pickup device including a plurality of unit pixels, each of which has a plurality of photoelectric conversion elements for converting the optical image to the picked-up image signal, wherein the method comprises determining a posture of the image pickup apparatus when an image pickup operation is performed by the image pickup apparatus, grouping the plurality of photoelectric conversion elements in each unit pixel into a plurality of photoelectric conversion element groups according to a result of the determining, and generating a plurality of image signals from picked-up image signals output from the photoelectric conversion element groups, respectively.

Advantageous Effects of Invention

According to the present invention, it is possible to generate image signals for viewing images shot in a composition (vertical composition or horizontal composition) intended by a photographer (user) as a three-dimensional image.

Further features of the present invention will become apparent from the following description of exemplary embodiments with reference to the attached drawings.

BRIEF DESCRIPTION OF DRAWINGS

FIGS. 2A to 2C are diagrams useful in explaining the arrangement of a solid-state image pickup device appearing in FIG. 1, in which FIG. 2A is a schematic illustration of the whole solid-state image pickup device 3 of the camera in a horizontal position, FIG. 2B is a schematic illustration of the whole solid-state image pickup device of the camera in a vertical position, and FIG. 2C shows the arrangement of a unit pixel of the solid-state image pickup device.

FIGS. 4A and 4B are diagrams useful in explaining combinations of photo diodes of the unit pixel shown in FIG. 2C, in which FIG. 4A shows combinations of the photo diodes selected when the camera is in the horizontal position, and FIG. 4B shows combinations of the photo diodes selected when the camera is in the vertical position.

FIGS. 5A and 5B are timing diagrams useful in explaining two drive modes, different from each other, of the solid-state image pickup device illustrated in FIGS. 2A to 2C, in which FIG. 5A is a timing diagram useful in explaining a first readout mode, and FIG. 5B is a timing diagram useful in explaining a second readout mode.

FIGS. 7A and 7B are views useful in explaining whether the camera shown in FIG. 1 is in the horizontal position or in the vertical position, in which FIG. 7A shows the horizontal position of the camera, and FIG. 7B shows the vertical position of the camera.

FIGS. 8A and 8B are respective schematic views of images in a horizontal composition and a vertical composition, in which FIG. 8A schematically illustrates images formed by first and second image signals, respectively, when the camera is in the horizontal position shown in FIG. 7A, and FIG. 8B schematically illustrates images formed by the first and second image signals, respectively, when the camera is in the vertical position shown in FIG. 7B.

DESCRIPTION OF EMBODIMENTS

The present invention will now be described in detail below with reference to the drawings showing an embodiment thereof.

Figure 1:
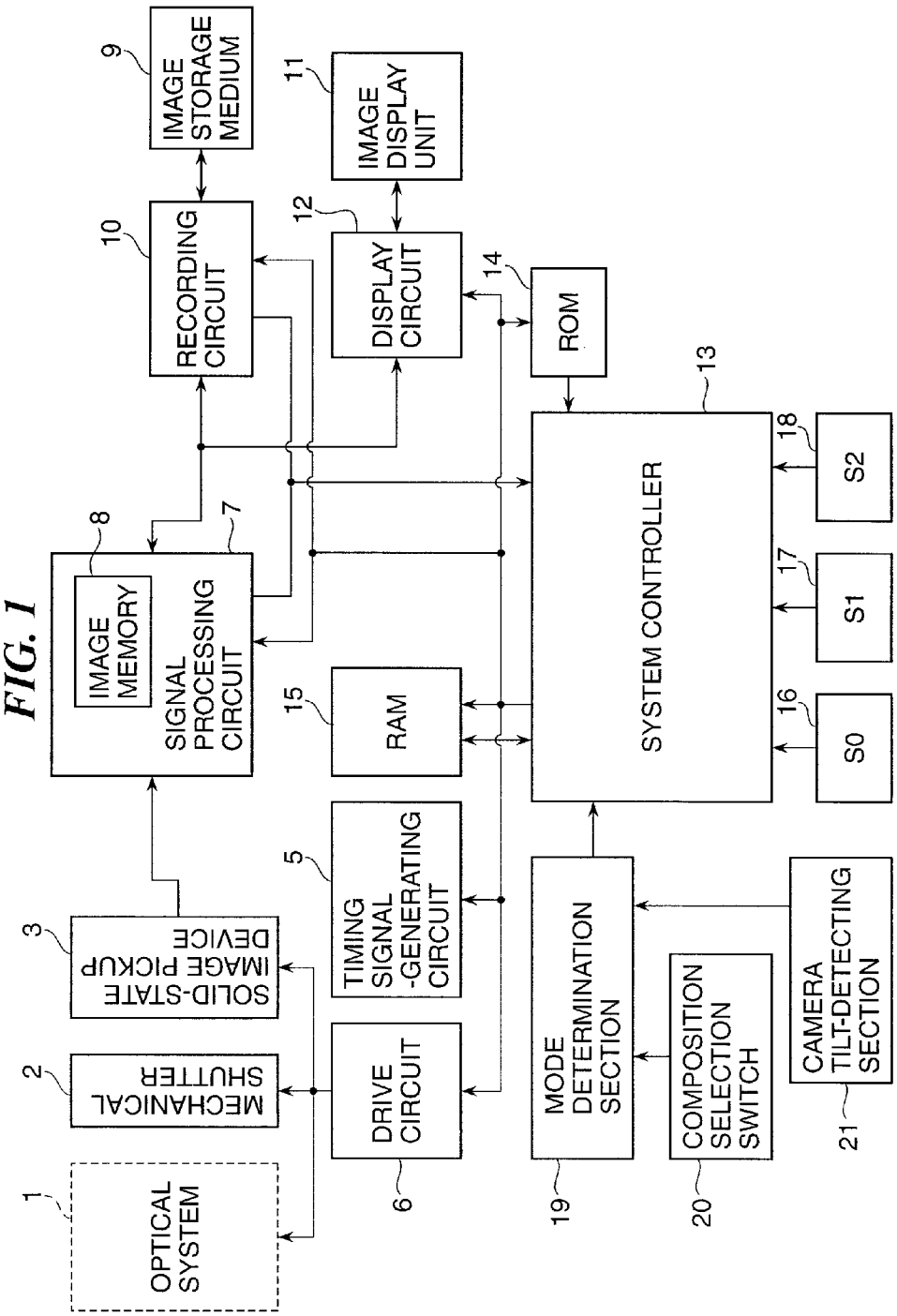
FIG. 1 is a block diagram of a camera as an image pickup apparatus according to an embodiment of the present invention.

FIG. 1 is a block diagram of a camera as an image pickup apparatus according to an embodiment of the present invention.

Referring to FIG. 1, the illustrated image pickup apparatus (hereinafter simply referred to as the camera) includes an optical system 1 having optical members, such as lenses and a diaphragm. A mechanical shutter 2 is provided behind the optical system 1, and performs light blocking for controlling exposure time of a solid-state image pickup device 3.

The solid-state image pickup device 3 (e.g. a CMOS image sensor) provided behind the mechanical shutter 2 converts an optical image (also referred to as the object images) formed on the solid-state image pickup device 3 to electric signals, and outputs the electric signals as picked-up image signals (also referred to as the image signals).

The camera includes a timing signal-generating circuit 5 and a drive circuit 6. The timing signal-generating circuit 5 generates a timing signal supplied to the drive circuit 6 for operating the solid-state image pickup device 3 and so forth under the control of a system controller 13. The drive circuit 6 drives the optical system 1, the mechanical shutter 2, and the solid-state image pickup device 3, as described hereinafter.

The above-mentioned picked-up image signals are supplied to a signal processing circuit 7, and the signal processing circuit 7 performs signal processing, such as various kinds of correction processing, on the picked-up image signals to form image data. Further, the signal processing circuit 7 stores the image data in an image memory 8 incorporated therein.

An image storage medium 9 is removably mounted in the camera, and image data is recorded in the image storage medium 9 by a recording circuit 10. Further, the image data is displayed on an image display unit (display section) 11 as an image, by a display circuit 12.

The camera is provided with the system controller 13 which controls the overall operation of the camera. A nonvolatile memory (ROM) 14 stores a control program executed by the system controller 13, and control data, such as parameters and tables used during execution of the control program, and further stores data used for various kinds of correction processing operations for the image signal.

The control program, control data, and correction data stored in the nonvolatile memory 14 are transferred to and loaded into a volatile memory (RAM) 15, and the system controller 13 executes the control of the camera according to the control program, the control data, and the correction data, which have been loaded into the volatile memory 15.

Also connected to the system controller 13 are a power switch (S0) 16, a shooting preparation instruction switch (S1) 17, a shooting start switch (S2) 18, and a mode determination section 19.

The power switch 16 is for turning on and off the power of the camera, and the shooting preparation instruction switch 17 is for instructing the system controller 13 to start various kinds of shooting preparation operations before performing shooting operation. Further, the shooting start switch 18 is for instructing the system controller 13 to start the shooting operation of the camera. The mode determination section 19 detects a shooting composition (hereinafter also simply referred to as a "composition") defined by a posture (position) of the camera in a state held by the user for shooting, and determines the mode of the camera based on a result of detection.

The camera includes a composition selection switch 20 and a camera tilt-detecting section 21 (tilt detection unit). For example, the user selects one of three composition modes: a vertical composition mode, a horizontal composition mode, and an automatic setting mode, and sets the camera to the selected mode, using the composition selection switch 20 (user setting unit).

The camera tilt-detecting section 21 is e.g. a gyroscope. The mode determination section 19 determines a readout mode for reading out signals or an image processing mode of the solid-state image pickup device 3 according to a composition mode selected by the composition selection switch 20 (a selected composition mode) and the result of tilt detection by the camera tilt-detecting section 21.

The above-described arrangement of the camera is an example of the arrangement necessary to realize the present invention, and the arrangement of the camera is not limited to the illustrated example, but can be modified in various forms.

Figure 2:
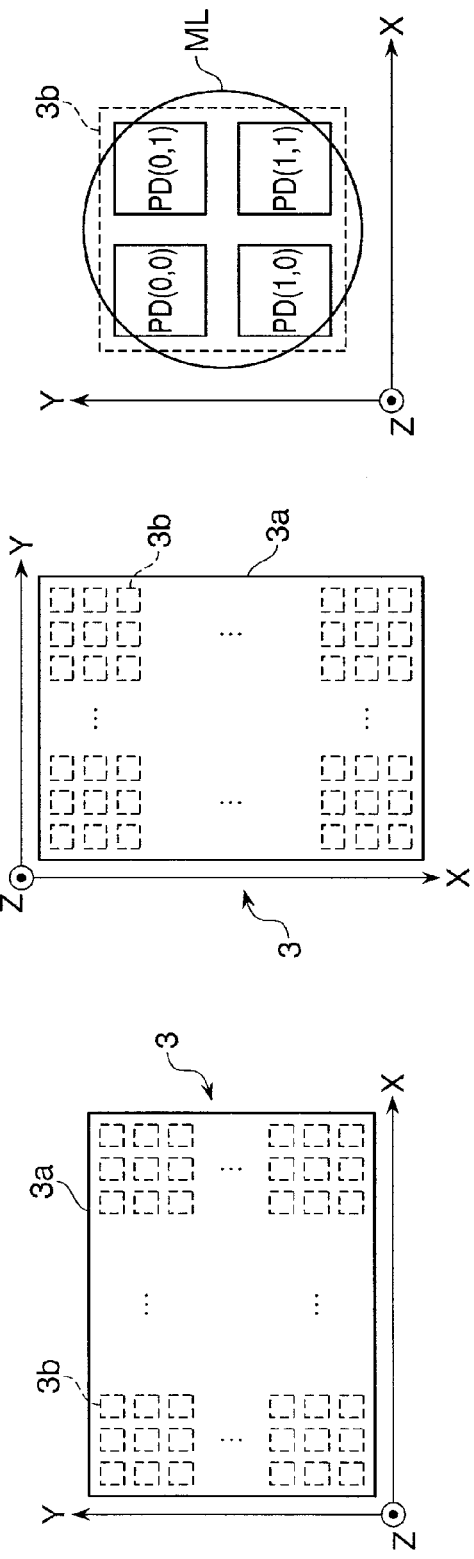

FIGS. 2A to 2C are diagrams useful in explaining the arrangement of the solid-state image pickup device 3 appearing in FIG. 1. FIG. 2A is a schematic illustration of the whole solid-state image pickup device 3 of the camera in a horizontal position. FIG. 2B is a schematic illustration of the whole solid-state image pickup device 3 of the camera in a vertical position. Further, FIG. 2C shows the arrangement of a unit pixel-detecting element (hereinafter simply referred to as a "unit pixel") 3b of the solid-state image pickup device.

As shown in FIGS. 2A and 2B, the solid-state image pickup device 3 has a rectangular shape having a short side and a long side. The solid-state image pickup device 3 has a plurality of unit pixels 3b arranged in a matrix (in the two-dimensional matrix) on an image pickup surface 3a having a two-dimensional planar shape.

Note that in a case where the solid-state image pickup device 3 incorporated in the image pickup apparatus is viewed from the front of the camera, an axis parallel to the bottom surface of the camera is defined as an X axis, an axis perpendicular to the bottom surface of the camera is defined as a Y axis, and an axis perpendicular to the surface of the solid-state image pickup device 3 (image pickup surface) is defined as a Z axis.

It is assumed that the solid-state image pickup device 3 is incorporated in the camera such that the long side of the solid-state image pickup device 3 is parallel to the bottom surface of the camera. Therefore, an axis parallel to the long side of the solid-state image pickup device 3 is the X axis, and an axis parallel to the short side of the solid-state image pickup device 3 is the Y axis.

In FIG. 2A, the X axis extends in a horizontal direction, and the Y axis extends in a vertical direction. A composition of an image which the user shoots with the camera held in a horizontal posture (position) such that the solid-state image pickup device 3 is thus horizontally positioned is referred to as a horizontal composition. Similarly, in FIG. 2B, the X axis extends in the vertical direction, and the Y axis extends in the horizontal direction. A composition of an image which the user shoots with the camera held in a vertical posture (position) such that the solid-state image pickup device 3 is thus vertically positioned is referred to as a vertical composition.

As shown in FIG. 2C, each of the unit pixels 3b has a plurality of photo diodes (photoelectric conversion section) PD (0, 0), (0, 1), (1, 0), and (1, 1), and a micro lens ML arranged on the photo diodes PD (0, 0), (0, 1), (1, 0), and (1, 1). The photo diodes PD (0, 0), (0, 1), (1, 0), and (1, 1) function as a photoelectric conversion unit for converting light to an electric signal, and convert light incident thereon to electric signals and output the electric signals. Further, the micro lens ML functions as a light collecting unit for collecting light onto the photo diodes PD.

Figure 3:
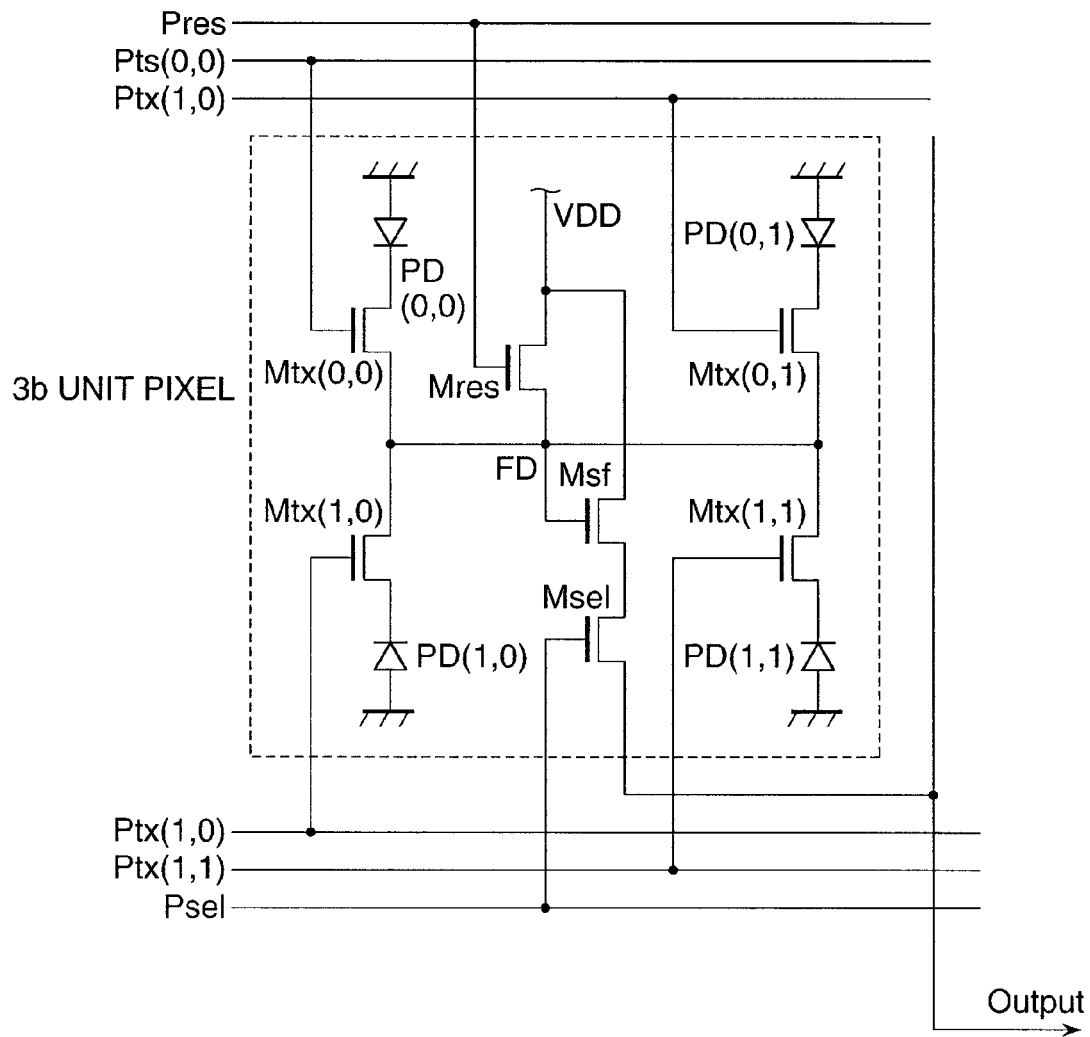
FIG. 3 is a circuit diagram of the unit pixel shown in FIG. 2C.

FIG. 3 is a circuit diagram of the unit pixel 3b illustrated in FIG. 2C. Here, a description will be given assuming that the solid-state image pickup device 3 is a CMOS image sensor.

Referring to FIG. 3, in the illustrated example, the unit pixel 3b has the four photo diodes PD (0, 0), PD (0, 1), PD (1, 0), and PD (1, 1). Transfer MOS transistors Mtx (0, 0), Mtx (0, 1), Mtx (1, 0), and Mtx (1, 1) are connected to the photo diodes PD (0, 0), PD (0, 1), PD (1, 0), and PD (1, 1), respectively. These transfer MOS transistors Mtx (0, 0), Mtx (0, 1), Mtx (1, 0), and Mtx (1, 1) transfer respective charges accumulated in the photo diodes PD (0, 0), PD (0, 1), PD (1, 0), and PD (1, 1) to a FD (floating diffusion) region.

A reset MOS transistor Mres resets the unit pixel 3b by discharging charges remaining in respective portions of the unit pixel 3b. An amplifying MOS transistor Msf outputs a voltage signal (Msf signal) dependent on charges transferred to the FD region. Further, a selection MOS transistor Msel selects the unit pixel 3b which outputs the voltage signal.

More specifically, drain terminals of the transfer MOS transistors Mtx (0, 0), Mtx (0, 1), Mtx (1, 0), and Mtx (1, 1) are connected to the photo diodes PD (0, 0), PD (0, 1), PD (1, 0), and PD (1, 1), respectively. Further, source terminals of the transfer MOS transistors Mtx are connected to the FD region.

Transfer pulses Ptx (0, 0), Ptx (0, 1), Ptx (1, 0), and Ptx (1, 1) output from a control signal output section (not shown) of the drive circuit 6 are supplied to gates of the transfer MOS transistors Mtx (0, 0), Mtx (0, 1), Mtx (1, 0), and Mtx (1, 1), respectively. The transfer pulses Ptx (0, 0), Ptx (0, 1), Ptx (1, 0), and Ptx (1, 1) activate the transfer MOS transistors Mtx (0, 0), Mtx (0, 1), Mtx (1, 0), and Mtx (1, 1), respectively. By this operation, charges generated in the photo diodes PD (0, 0), PD (0, 1), PD (1, 0), and PD (1, 1) by photoelectric conversion are transferred to the FD region.

In the illustrated example, the transfer MOS transistors Mtx (0, 0), Mtx (0, 1), Mtx (1, 0), and Mtx (1, 1) are independently controlled, and hence it is possible to selectively transfer a charge generated in a desired one of the photo diode PD (0, 0), PD (0, 1), PD (1, 0), and PD (1, 1) to the FD region provided at a latter stage.

Further, by selectively transferring respective charges generated in a plurality of ones of the photo diodes PD (0, 0), PD (0, 1), PD (1, 0), and PD (1, 1) to the FD region, it is possible to add i.e. combine the charges output from the desired ones of the photo diode PD (0, 0), PD (0, 1), PD (1, 0), or PD (1, 1) in the FD region of the unit pixel 3b.

The amplifying MOS transistor Msf amplifies a charge signal transferred from the photo diode PD (0, 0), PD (0, 1), PD (1, 0), or PD (1, 1), and outputs the amplified charge signal as a voltage signal.

A selection pulse Psel output from the control signal output section of the drive circuit 6 is supplied to a gate of the selection MOS transistor Msel. The selection pulse Psel activates the selection MOS transistor Msel, whereby the voltage signal is output from the amplifying MOS transistor Msf to a section provided at a latter stage. By selectively applying the selection pulse Psel to a desired unit pixel 3b, it is possible to cause the desired unit pixel 3b to output the voltage signal.

The drains of the transfer MOS transistors Mtx and the gate of the amplifying MOS transistor Msf are connected to a voltage source VDD via the reset MOS transistor Mres. By supplying a reset pulse Pres to the gate of the reset MOS transistor Mres from the control signal output section of the drive circuit 6, the reset MOS transistor Mres is activated. This causes the signal charge remaining in the FD region to be discharged to thereby reset the unit pixel 3b.

As described above, the illustrated solid-state image pickup device 3 has the plurality of photo diodes PD for each micro lens ML, and is capable of adding i.e. combining outputs from arbitrary photo diodes PD included in the unit pixel 3b. However, the illustrated example is only one example, and the solid-state image pickup device can be modified in various forms insofar as it has a plurality of photoelectric conversion units (i.e. photo diodes) for each light collecting unit (i.e. micro lens). For example, in each unit pixel, the plurality of photo diodes PD may be arranged obliquely with respect to the vertical and horizontal directions.

Note that to produce parallaxes in a plurality of directions between the plurality of photoelectric conversion units included in one unit pixel, it is preferable to provide three or more photo diodes PD.

FIGS. 4A and 4B are diagrams useful in explaining combinations of the photo diodes PD of the unit pixel 3b appearing in FIG. 2C, in which FIG. 4A shows combinations of the photo diodes PD selected when the camera in the horizontal position, and FIG. 4B shows combinations of the photo diodes PD selected when the camera in the vertical position.

FIG. 4A corresponds to FIG. 2A, and the photo diodes PD (0, 0) and PD (1, 0) disposed at locations corresponding in the X-axis direction and adjacent in the Y-axis direction are grouped from the plurality of photo diodes PD (0, 0), PD (0, 1), PD (1, 0), and PD (1, 1) included in the unit pixel 3b, and are set as a first PD group (photoelectric conversion element group) 31.

Similarly, the photo diodes PD (0, 1) and PD (1, 1) are grouped, and are set as a second PD group (photoelectric conversion element group) 32. Then, images are generated from outputs from the groups of photo diodes PD (i.e. the first and second PD groups), respectively. As a result, first and second image signals having different parallaxes in the X-axis direction are obtained. A readout mode at this time is hereinafter referred to as Read Out 1.

More specifically, the photo diodes PD (0, 0) and PD (1, 0) are set as the first photoelectric conversion element group 31, and the first image signal is generated using the output from the first photoelectric conversion element group 31. Further, the photo diodes PD (0, 1) and PD (1, 1) are set as the second photoelectric conversion element group 32, and the second image signal is generated using the output from the second photoelectric conversion element group 32.

The thus obtained first and second image signals are used as the "left-eye image" and the "right-eye image", respectively. In this case, the solid-state image pickup device 3 in the position shown in FIG. 2A outputs the image signals in the horizontal composition, which can be viewed as a three-dimensional image, as described hereinafter.

On the other hand, FIG. 4B corresponds to FIG. 2B, and the photo diodes PD (0, 0) and PD (0, 1) arranged at locations corresponding in the Y-axis direction and adjacent in the X-axis direction are grouped from the plurality of photo diodes PD (0, 0), PD (0, 1), PD (1, 0), and PD (1, 1) included in the unit pixel 3b, and are set as the first PD group 31. Similarly, the photo diodes PD (1, 0) and PD (1, 1) are grouped, and are set as the second PD group 32. Then, images are generated from outputs from the groups of photo diodes PD (i.e. the first and second PD groups), respectively. As a result, first and second image signals having different parallaxes in the Y-axis direction are obtained. A readout mode at this time is hereinafter referred to as Read Out 2.

More specifically, the photo diodes PD (1, 0) and PD (1, 1) are set as the first photoelectric conversion element group 31, and the first image signal is generated using the output from the first photoelectric conversion element group 31. Further, the photo diodes PD (0, 0) and PD (0, 1) are set as the second photoelectric conversion element group 32, and the second image signal is generated using the output from the second photoelectric conversion element group 32.

The thus obtained first and second image signals are used as the "left-eye image" and the "right-eye image", respectively. In this case, it is possible to view a three-dimensional image from a viewpoint rotated by 90° from the FIG. 4A state. That is, the solid-state image pickup device 3 in the position shown in FIG. 2B outputs the image signals in the vertical composition, which can be viewed as a three-dimensional image, as described hereinafter.

Figure 5B:
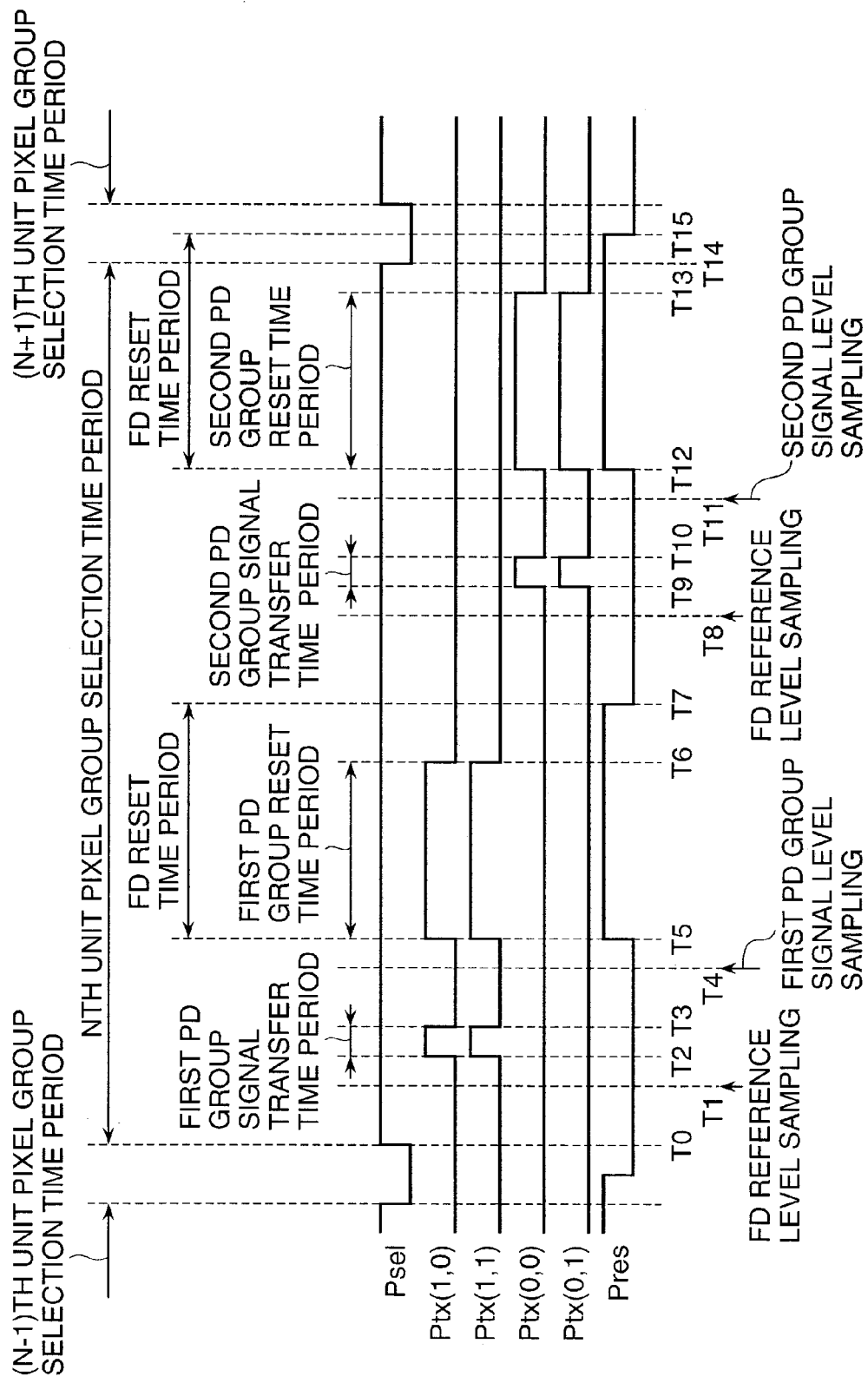

FIGS. 5A and 5B are timing diagrams useful in explaining two drive modes, which are different from each other, of the solid-state image pickup device 3 shown in FIGS. 2A to 2C, in which FIG. 5A shows a timing diagram useful in explaining the first readout mode (Read Out 1), and FIG. 5B shows a timing diagram useful in explaining the second readout mode (Read Out 2).

First, referring to FIG. 5A, a description will be given of a case where as shown in FIG. 4A, charges output from the photo diodes PD (0, 0) and PD (1, 0), and the photo diodes PD (0, 1) and PD (1, 1), which are arranged at locations adjacent in the Y-axis direction, respectively, are added and read out.

In the following description, an operation for reading out an Nth unit pixel group (N is an integer more than 1) will be described. The unit pixel group is formed by a plurality of unit pixels, to which control pulses are supplied in the same timing. Then, in the operation during a time period from time T0 to time T15, the reading operation is simultaneously performed for the unit pixel group. Further, the reading operation is performed on a unit pixel group-by-unit pixel group basis to thereby read outputs from all of the pixels of the solid-state image pickup device 3.

When paying attention to one unit pixel, the photo diodes PD included in the unit pixel are divided into a plurality of PD groups, and the reading operation is sequentially performed at respective different timings for PD groups. More specifically, in FIG. 5A, the photo diodes PD included in the unit pixel is divided into two PD groups, and the reading operation is sequentially performed on the first PD group and then on the second PD group.

First, at time T0, the level of the selection pulse Psel goes high, which activates the selection MOS transistor Msel. This causes the unit pixel group from which the signal is to be read is electrically connected to a reading circuit (now shown) provided at a latter stage. After thus selecting the unit pixel group from which the signal is to be read out, first, signal reading from the first PD group 31 is executed.

At time T1, a voltage level corresponding to a charge in the FD region before signal charges are transferred from the photo diodes PD is held in a reference signal-holding section (not shown) of the reading circuit as a first reference signal.

At time T2, the respective levels of the transfer pulses Ptx (0, 0) and Ptx (1, 0) go high, which activates the transfer MOS transistors Mtx (0, 0) and Mtx (1, 0). This selects the photo diodes PD (0, 0) and PD (1, 0) as the first PD group 31, and starts to cause signal charges generated in the photo diodes PD (0, 0) and PD (1, 0) to be transferred to the FD region.

At time T3, the respective levels of the transfer pulses Ptx (0, 0) and Ptx (1, 0) go low, which activates the transfer MOS transistors Mtx (0, 0) and Mtx (1, 0). This terminates the transfer of the signal charges from the first PD group to the FD region.

At time T4, the voltage level corresponding to the charges transferred to the FD region is held in an accumulated signal-holding section (not shown) of the reading circuit as an accumulated signal of the first PD group.

Thus, the operation of signal reading from the first PD group is completed. A differential signal is obtained by a difference circuit (not shown) according to the difference between the accumulated signal of the first PD group 31 held in the accumulated signal-holding section and the first reference signal, and is used for generation of the first image signal.

Next, in preparation for the operation of signal reading from the second PD group, the charges in the FD region and the first PD group are reset.

More specifically, at time T5, the level of the reset pulse Pres goes high, which activates the reset MOS transistor Mres. Further, the respective levels of the transfer pulses Ptx (0, 0) and Ptx (1, 0) go high, which activates the transfer MOS transistors Mtx (0, 0) and Mtx (1, 0). Then, the FD region, and the photo diodes PD (0, 0) and PD (1, 0), from which signal reading has been completed, are reset.

Then, at time T6, the respective levels of the transfer pulses Ptx (0, 0) and Ptx (1, 0) go low, which deactivates the transfer MOS transistors Mtx (0, 0) and Mtx (1, 0). This terminates the resetting of the photo diodes PD (0, 0) and PD (1, 0).

At time T7, the level of the reset pulse Pres goes low, which deactivates the reset MOS transistor Mres. This terminates the resetting of the FD region.

After thus completing the resetting the FD region and the first PD group, the operation of signal reading from the second PD group is performed.

More specifically, at time T8, the voltage level corresponding to a charge in the FD region before signal charges are transferred from the photo diodes PD is held in the reference signal-holding section as a second reference signal.

At time T9, the respective levels of the transfer pulses Ptx (0, 1) and Ptx (1, 1) go high, which activates the transfer MOS transistors Mtx (0, 1) and Mtx (1, 1) This selects the photo diodes PD (0, 1) and PD (1, 1) as the second PD group 32, and starts to cause signal charges generated in the photo diodes PD (0, 1) and PD (1, 1) to be transferred to the FD region.

At time T10, the respective levels of the transfer pulses Ptx (0, 1) and Ptx (1, 1) go low, which deactivates the transfer MOS transistors Mtx (0, 1) and Mtx (1, 1). This terminates the transfer of the signal charges from the second PD group 32 to the FD region.

At time T11, a voltage level corresponding to the charges transferred from the second PD group 32 to the FD region is held in the accumulated signal-holding section as an accumulated signal of the second PD group 32.

Thus, the operation of signal reading from the second PD group 32 is completed. A differential signal is obtained by the difference circuit according to the difference between the accumulated signal of the second PD group 32 and the second reference signal, and is used for generation of the second image signal. Finally, the charges in the FD region and the second PD group are reset.

More specifically, at time T12, the level of the reset pulse Pres goes high, which activates the reset MOS transistor Mres. Further, the respective levels of the transfer pulses Ptx (0, 1) and Ptx (1, 1) go high, which activates the transfer MOS transistors Mtx (0, 1) and Mtx (1, 1). Then, the FD region, and the photo diodes PD (0, 1) and PD (1, 1), from which signal reading has been completed, are reset.

At time T13, the level of the selection pulse Psel goes low, which deactivates the selection MOS transistor Msel. This electrically disconnects the unit pixel group from which signal reading has been completed, from the reading circuit.

At time T14, the respective levels of the transfer pulses Ptx (0, 1) and Ptx (1, 1) go low, which deactivates the transfer MOS transistors Mtx (0, 1) and Mtx (1, 1). This terminates the resetting of the photo diodes PD (0, 1) and PD (1, 1).

At time T15, the level of the reset pulse Pres goes low, which deactivates the reset MOS transistor Mres. This terminates the resetting of the FD region.

All the operations of signal reading from the Nth unit pixel group are thus completed. Although the reading operation is first performed on the first PD group 31, and then is performed on the second PD group 32, the reading operation may be performed on the second PD group 32 and then on the first PD group 31.

Further, although the resetting of the respective PD groups before starting charge accumulation may be performed at the same time, to make the PD groups equal in length of time for charge accumulation, it is preferable to shift the timing of reset according to the timing of charge transfer from each PD group.

Alternatively, to make the PD groups equal in length of time and timing for charge accumulation, a memory for holding a signal charge from each photo diode PD may be provided between an associated one of the transfer MOS transistors Mtx and the FD region. In this case, it is only required that all of the photo diodes PD are each simultaneously subjected to a sequence of operations of reset before charge accumulation, charge accumulation, and charge transfer therefrom to the associated memory, and then, for outputs from photo diodes PD to be added, charge transfer is performed from the memories associated with the photo diodes PD to the FD region.

In the present embodiment, although the description has been given of how each unit pixel is driven when outputs from photo diodes PD provided in the same PD group are read out after adding them within the unit pixel, it is also possible to read out the outputs from the respective photo diodes PD without adding them within the unit pixel.

In the case where the signal charges output from the respective photo diodes PD are read out without adding the same within the unit pixel, it is only required to perform control such that signal charges are output from the respective photo diodes PD at the separate timings by individually controlling the transfer pulses Ptx. By adding the outputs using thus obtained signals (outputs) at a latter stage, it is also possible to obtain the signals from the first PD group and the signal from the second PD group. As a result, it is possible to obtain the first and second image signals having parallax in the X-axis direction.

By using this readout as Read Out 1, it is also possible to obtain a three-dimensional image which can be viewed in the intended horizontal composition. Note that the latter stage is intended to mean the reading circuit or the signal processing circuit 7 provided in the solid-state image pickup device 3, and one of these circuits includes a signal addition circuit.

Further, by applying one of the transfer pulses Mtx to be applied to each PD group, it is possible to selectively read out a signal (output) from one of the photo diodes PD included in the PD group. By using thus obtained signals (outputs), it is also possible to obtain the first and second image signals having parallax in the X-axis direction. By performing the above-described readout, it is also possible to obtain a three-dimensional image which can be viewed in the horizontal composition.

Next, a description will be given of a case where two pairs of outputs from the photo diodes PD (1, 0) and PD (1, 1) and the photo diodes PD (0, 0) and PD (0, 1), each pair of photo diodes being adjacent to each other in the X-axis direction, as shown in FIG. 4B are respectively added to be read out, with reference to FIG. 5B.

First, at time T0, the level of the selection pulse Psel goes high, which activates the selection MOS transistor Msel. This causes the unit pixel group from which the signal is to be read out is electrically connected to the reading circuit (not shown) provided at the latter stage. After thus selecting the unit pixel group from which the signal is to be read out, first, signal reading from the first PD group 31 is executed.

At time T1, the voltage level corresponding to a charge in the FD region before signal charges are transferred from the photo diodes PD is held in the reference signal-holding section (not shown) of the reading circuit as the first reference signal.

Then, at time T2, the respective levels of the transfer pulses Ptx (1, 0) and Ptx (1, 1) go high, which activates the transfer MOS transistors Mtx (1, 0) and Mtx (1, 1). This selects the photo diodes PD (1, 0) and PD (1, 1) as the first PD group 32, and starts to cause signal charges generated in the photo diodes PD (1, 0) and PD (1, 1) to be transferred to the FD region.

At time T3, the respective levels of the transfer pulses Ptx (1, 0) and Ptx (1, 1) go low, which deactivates the transfer MOS transistors Mtx (1, 0) and Mtx (1, 1). This terminates the transfer of the signal charges from the first PD group 31 to the FD region.

At time T4, a voltage level corresponding to the charges transferred to the FD region is held in the accumulated signal-holding section (not shown) of the reading circuit as an accumulated signal of the first PD group.

Thus, the operation of signal reading from the first PD group is completed. A differential signal is obtained by the difference circuit (not shown) according to the difference between the accumulated signal of the first PD group 31 held in the accumulated signal-holding section and the first reference signal, and is used for generation of the first image signal.

Next, in preparation for the operation of signal reading from the second PD group, the charges in the FD region and the first PD group are reset.

More specifically, at time T5, the level of the reset pulse Pres goes high, which activates the reset MOS transistor Mres. Further, the respective levels of the transfer pulses Ptx (1, 0) and Ptx (1, 1) go high, which activates the transfer MOS transistors Mtx (1, 0) and Mtx (1, 1). Then, the FD region, and the photo diodes PD (1, 0) and PD (1, 1), from which signal reading has been completed, are reset.

At time T6, the respective levels of the transfer pulses Ptx (1, 0) and Ptx (1, 1) go low, which activates the transfer MOS transistors Mtx (1, 0) and Mtx (1, 1). This terminates the resetting of the photo diodes PD (1, 0) and PD (1, 1).

At time T7, the level of the reset pulse Pres goes low, which deactivates the reset MOS transistor Mres. This terminates the resetting of the FD region.

After thus completing the resetting of the FD region and the first PD group, the operation of signal reading from the second PD group is performed.

More specifically, at time T8, a voltage level corresponding to a charge in the FD region before signal charges are transferred from the photo diodes PD is held in the reference signal-holding section as the second reference signal.

At time T9, the respective levels of the transfer pulses Ptx (0, 0) and Ptx (0, 1) go high, which activates the transfer MOS transistors Mtx (0, 0) and Mtx (0, 1). This selects the photo diodes PD (0, 0) and PD (0, 1) as the second PD group 32, and starts to cause signal charges generated in the photo diodes PD (0, 0) and PD (0, 1) to be transferred to the FD region.

At time T10, the respective levels of the transfer pulses Ptx (0, 0) and Ptx (0, 1) go low, which deactivates the transfer MOS transistors Mtx (0, 0) and Mtx (0, 1). This terminates the transfer of the signal charges from the second PD group 32 to the FD region.

At time T11, a voltage level corresponding to the charges transferred from the second PD group 32 to the FD region is held in the accumulated signal-holding section as an accumulated signal of the second PD group 32.

The operation of signal reading from the second PD group 32 is thus completed. A differential signal is obtained by the differential circuit according to the difference between the accumulated signal of the second PD group 32 and the second reference signal, and is used for generation of the second image signal. Finally, the charges in the FD region and the second PD group are reset.

More specifically, at time T12, the level of the reset pulse Pres goes high, which activates the reset MOS transistor Mres. Further, the respective levels of the transfer pulses Ptx (0, 0) and Ptx (0, 1) go high, which activates the transfer MOS transistors Mtx (0, 0) and Mtx (0, 1). Then, the FD region, and the photo diodes PD (0, 0) and PD (0, 1), from which signal reading has been completed, are reset.

At time T13, the level of the selection pulse Psel goes low, which deactivates the selection MOS transistor Msel. This electrically disconnects the unit pixel group from which signal reading has been terminated, from the reading circuit.

At time T14, the respective levels of the transfer pulses Ptx (0, 0) and Ptx (0, 1) go low, which deactivates the transfer MOS transistors Mtx (1, 0) and Mtx (1, 1). This terminates the resetting of the photo diodes PD (1, 0) and PD (1, 1).

At time T15, the level of the reset pulse Pres goes low, which deactivates the reset MOS transistor Mres. This terminates the resetting of the FD region.

In the case where signal charges output from the respective photo diodes PD are read out without adding the same in the unit pixel, it is only required to perform control such that signal charges are output from the respective photo diodes PD at different timings by individually controlling the transfer pulses Ptx. By adding outputs using thus obtained signals (outputs) at a latter stage, it is also possible to obtain signals from the first PD group and the signal from the second PD group. As a result, it is possible to obtain the first and second image signals having parallax in the Y-axis direction.

By using the signals thus read out as Read Out 2, it is also possible to obtain a three-dimensional image which can be viewed in the intended vertical composition. Note that the latter stage is intended to mean the reading circuit or the signal processing circuit 7 provided in the solid-state image pickup device 3, and one of these circuits includes the signal addition circuit.

Further, by applying one of the transfer pulses Mtx to be applied to each PD group, it is possible to selectively read out a signal (output) from one of the photo diodes PD included in the PD group. By using thus obtained signals (outputs), it is also possible to obtain the first and second image signals having parallax in the Y-axis direction. By performing the above-described readout, it is also possible to obtain a three-dimensional image which can be viewed in the vertical composition.

Figure 6:
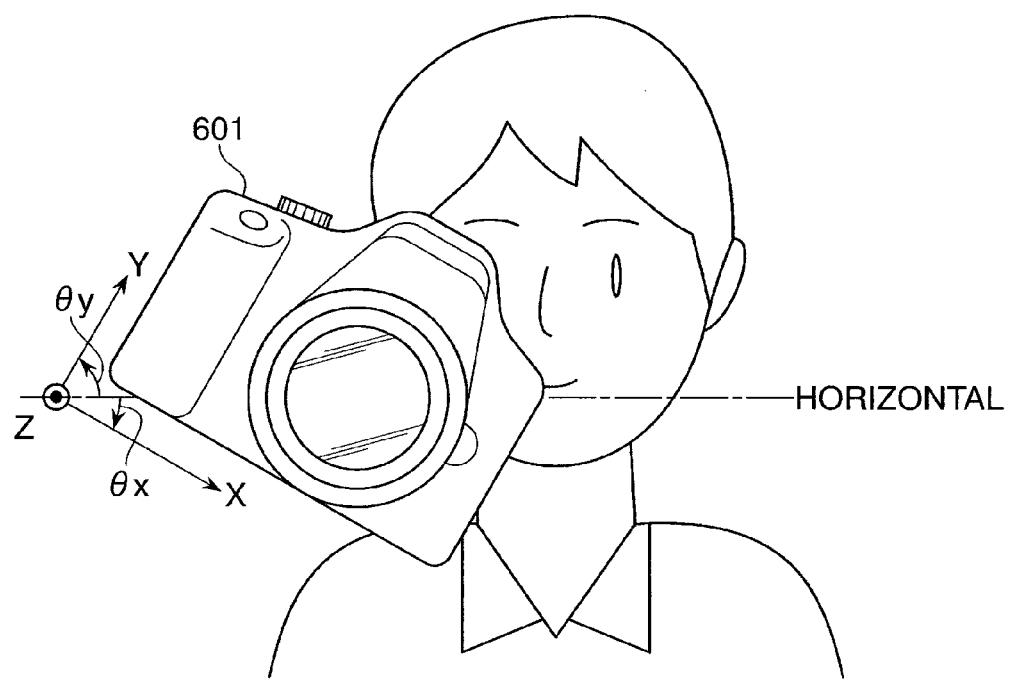
FIG. 6 is a view useful in explaining detection of a tilt of the camera shown in FIG. 1.

FIG. 6 is a view useful in explaining a detection of tilt (posture) of the camera described with reference to FIG. 1.

As mentioned above, the camera, denoted by reference numeral 601, includes the composition selection switch 20 and the camera tilt-detecting section 21. Now, in FIG. 6, a horizontal plane parallel to the bottom surface of the camera in the horizontal posture is used as a reference, and the camera tilt-detecting section 21 detects the absolute value $|\theta x|$ of an angle (tilt angle: first angle) between the X axis of the solid-state image pickup device 3 and the horizontal plane, and the absolute value $|\theta y|$ of an angle (tilt angle: second angle) between the Y axis of the solid-state image pickup device 3 and the horizontal plane.

Now, assuming that $0° \leq |\theta x| \leq 90°$ and $0° \leq |\theta y| \leq 90°$, the absolute values $|\theta x|$ and $|\theta y|$ are compared by a comparator (not shown). If, for example, this comparison gives $|\theta y| > |\theta x|$, the system controller 13 determines that the composition of an image intended by the user is the horizontal composition. On the other hand, the comparison gives $|\theta y| < |\theta x|$, the system controller 13 determines that the composition intended by the user is the vertical composition.

Figure 7A:
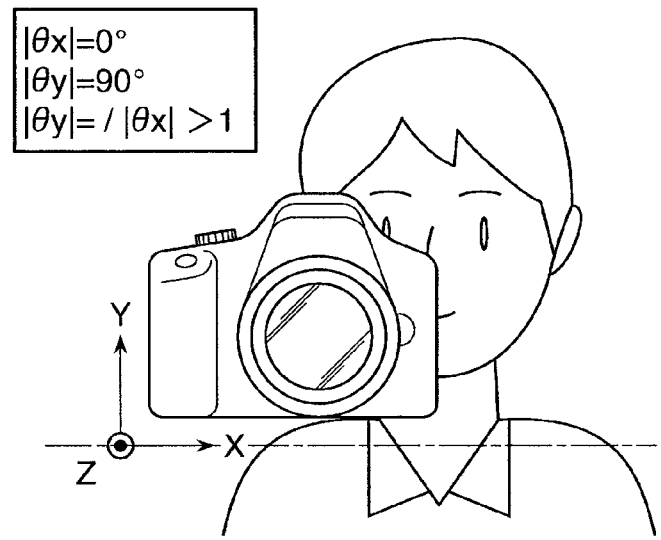
Figure 7B:
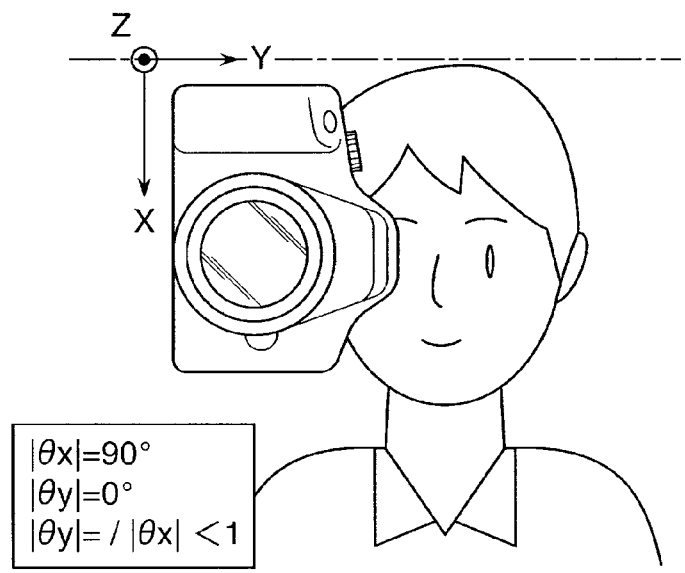

FIGS. 7A and 7B are views useful in explaining whether the camera described with reference to FIG. 1 is in the horizontal posture (position) or in the vertical posture (position). FIG. 7A shows the horizontal composition in which the user performs shooting with the camera held in the horizontal posture, and FIG. 7B shows the vertical composition in which the user performs shooting with the camera held in the vertical posture.

Further, FIGS. 8A and 8B respective schematic views of images in the horizontal composition and the vertical composition. FIG. 8A schematically shows images formed by the first and second image signals obtained by the camera in the horizontal posture shown in FIG. 7A, and FIG. 8B shows images formed by the first and second image signals obtained by camera in the vertical posture shown in FIG. 7B.

For example, as shown in FIG. 7A, when $|\theta x|=0°$ and $|\theta y|=90°$, the system controller 13 determines that the intended composition of an image is the horizontal composition. Then, the system controller 13 selects Read Out 1 as the readout mode to generate the first and second image signals from which the respective images shown in FIG. 8A are formed.

On the other hand, as shown in FIG. 7B, when $|\theta x|=90°$ and $|\theta y|=0°$, the system controller 13 determines that the intended composition of an image is the vertical composition. Then, the system controller 13 selects Read Out 2 as the readout mode to generate the first and second image signals from which the respective images shown in FIG. 8B are formed.

Note that when $|\theta x|=|\theta y|$, the system controller 13 determines that the intended composition of an image cannot be determined. The case where $|\theta x|=|\theta y|$ is e.g. a case where the camera 601 is tilted to an intermediate point where the composition is switched between the horizontal position and the vertical position.

Further, also when both of the absolute values $|\theta x|$ and $|\theta y|$ are equal to 0°, the system controller 13 determines that the intended composition of an image cannot be determined. The case where both of the absolute values |θx| and |θy| are equal to 0° is e.g. a case where the camera 601 is turned up or down at right angles to the horizontal plane.

The condition for determining that the intended composition of an image cannot be determined may be provided with a tolerance by taking into account a value corresponding to an error in the posture of the camera 601 set by the user. For example, assuming that an angle±α is taken into account as the value corresponding to an error of the posture of the camera, the system controller 13 determines that the intended composition of an image cannot be determined if |θx|=|θy|±α.

Although in the present embodiment, the point giving |θx|=|θy| is set as the composition switching point, this is not limitative, but, for example, the composition switching point may be set to the same point as a point where the display of the monitor is switched between the vertical display and the horizontal display according to the result of detection from the camera tilt-detecting section 21, which point is used in a case where the camera employs an automatic display switching mode in which the display is automatically switched between the vertical display and the horizontal display according to the result of detection from the camera tilt-detecting section 21.

Further, the composition switching point may be set according to an aspect ratio of an area used for generation of image signals in an image pickup area of the solid-state image pickup device 3. For example, when the aspect ratio is 3:2, and a long side of the image pickup area of the solid-state image pickup device 3 is disposed in the X-axis direction, the composition may be switched at a point where |θy|=|θx|×⅔.

Hereafter, a description will be given of the operation of the camera shown in FIG. 1.

Figure 9:
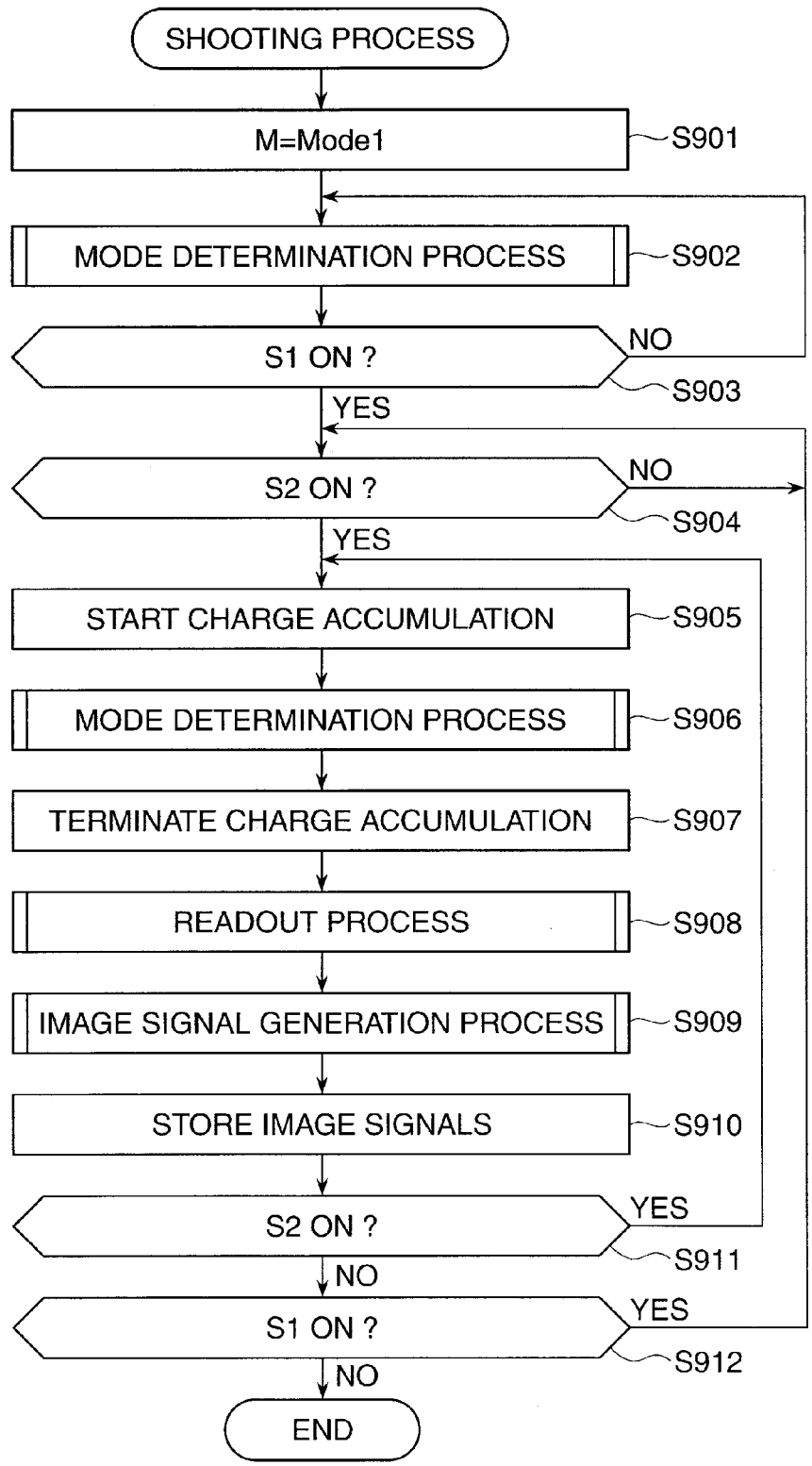
FIG. 9 is a flowchart of a shooting process executed by the camera as the image pickup apparatus shown in FIG. 1.

FIG. 9 is a flowchart of a shooting process executed by the camera as the image pickup apparatus shown in FIG. 1.

Referring to FIGS. 1 and 9, first, the system controller 13 sets a composition mode M to an initial value (step S901). In the illustrated example, the system controller 13 sets Mode 1 indicative of the horizontal composition as the initial value. Then, the system controller 13 executes a mode determination process, described hereinafter (step S902).

Next, the system controller 13 determines whether or not the shooting preparation instruction switch (S1) 17 has been turned on (step S903). If the shooting preparation instruction switch (S1) 17 has not been turned on (NO to the step S903), the system controller 13 returns to the step S902.

On the other hand, if the shooting preparation instruction switch (S1) 17 has been turned on (YES to the step S903), the system controller 13 determines whether or not the shooting start instruction switch (release switch) 18 has been turned on (step S904). If the release switch (S2) has not been turned on (NO to the step S904), the system controller 13 enters a standby state.

If the release switch (S2) has been turned on (YES to the step S904), the system controller 13 controls the drive circuit 6 to start accumulation of signal charges of the solid-state image pickup device 3 (step S905). Then, the system controller 13 performs the mode determination process again (step S906).

Then, the system controller 13 controls the drive circuit 6 to terminate the accumulation of signal charges of the solid-state image pickup device 3 (step S907). Then, the system controller 13 controls the drive circuit 6 to execute a readout process for reading out the signal charges (voltage signals) accumulated in the solid-state image pickup device 3 (step S908). Next, the signal processing section 7 executes an image signal generation process for generating image signals according to the read voltage signals under the control of the system controller 13 (step S909). Then, the generated image signals are stored in a storage medium by the recording circuit 10 as image data (step S910).

Next, the system controller 13 determines whether or not the release switch (S2) 18 remains on (step S911). If the release switch 18 remains on (YES to the step S911), the system controller 13 returns to the step S905.

On the other hand, if the release switch 18 no longer remains on (NO to the step S911), the system controller 13 determines whether or not the shooting preparation instruction switch (S1) 17 has been turned on (step S912). If the switch S1 has been turned on (YES to the step S912), the system controller 13 returns to the step S904.

If the switch S1 has not been turned on (NO to the step S912), the system controller 13 terminates the shooting operation.

Figure 10:
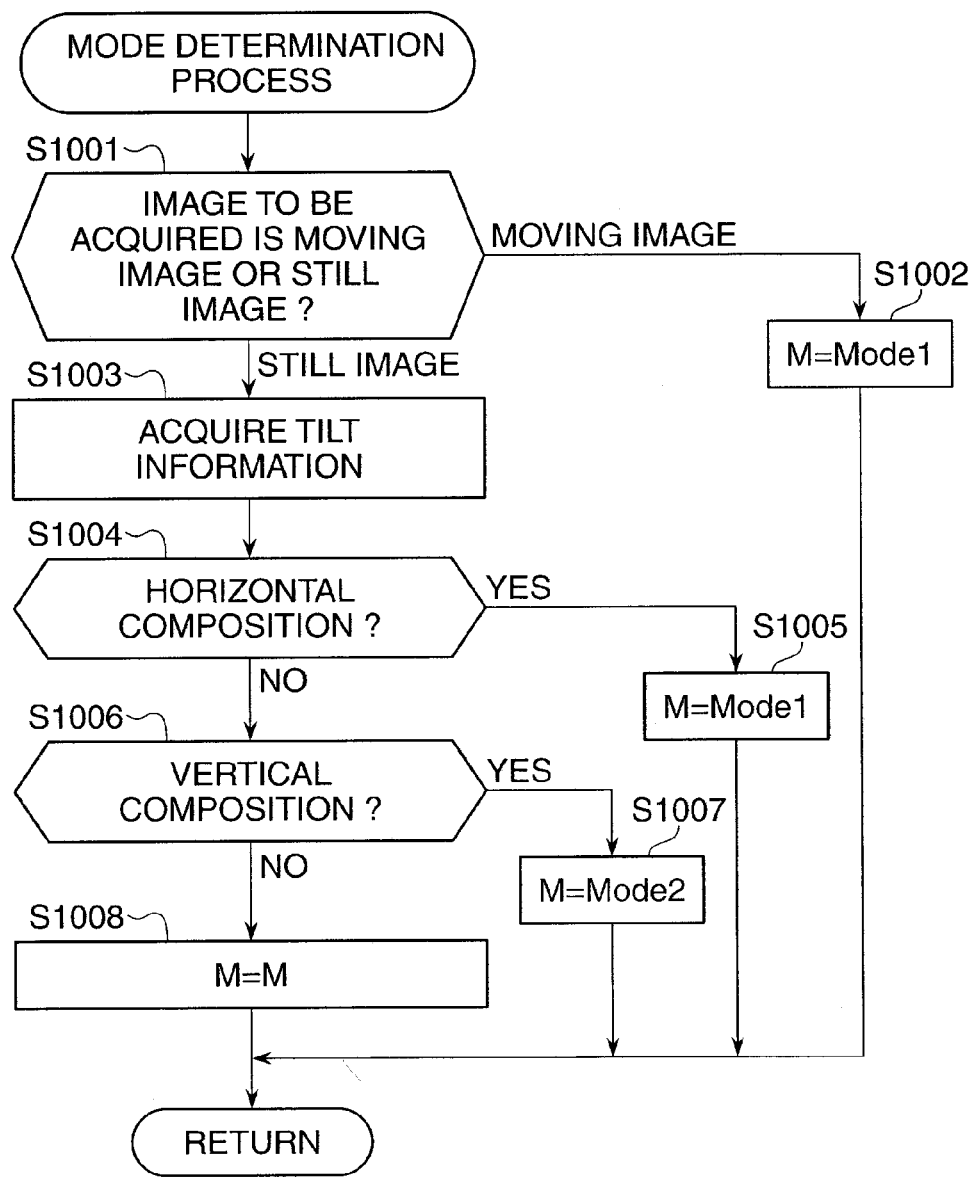
FIG. 10 is a flowchart of a mode determination process executed as a subroutine of the shooting process in FIG. 9.

FIG. 10 is a flowchart of the mode determination process executed as a subroutine in the steps S902 and S906 in the shooting process in FIG. 9. Hereinafter, the mode determination process will be described with reference to FIGS. 1 and 10.

When the mode determination process is started, first, the system controller 13 determines whether an image to be acquired is a moving image or a still image (step S1001). If the camera has been set to a moving image acquisition mode, an image to be acquired is a moving image. On the other hand, if the camera has been set to a still image acquisition mode, an image to be acquired is a still image.

If it is determined that the image to be acquired is a moving image (moving image in the step S1001), the system controller 13 sets the composition mode M to Mode 1 (step S1002), followed by terminating the mode determination process. Then, the system controller 13 proceeds to the step S903 or S907 in the shooting process in FIG. 9.

If it is determined that the image to be acquired is a still image (still image in the step S1001), the system controller 13 acquires tilt information indicative of the posture of the camera (step S1003). More specifically, the system controller 13 acquires the absolute values |θx| and |θy| of respective tilt angles of the X axis and the Y axis of the solid-state image pickup device 3 from the above-mentioned camera tilt-detecting section 21.

Next, the system controller 13 determines whether or not the composition intended by the user is the horizontal composition (i.e. whether the posture of the camera held by the user is the horizontal posture) according to the acquired tilt information (step S1004). For example, if |θy|>|θx|, the system controller 13 determines that the composition intended by the user is the horizontal composition.

If it is determined that the composition intended by the user is the horizontal composition (YES to the step S1004), the system controller 13 sets the composition mode M to Mode 1 (step S1005). Then, the system controller 13 proceeds to the step S903 or S907 in the shooting process in FIG. 9.

If it is determined that the composition intended by the user is not the horizontal composition (NO to the step S1004), the system controller 13 determines whether or not the composition intended by the user is the vertical composition (step S1006). For example, if |θy|<|θx|, the system controller 13 determines that the composition intended by the user is the vertical composition.

If it is determined that the composition intended by the user is the vertical composition (YES to the step S1006), the system controller 13 sets the composition mode M to Mode 2 (step S1007), followed by terminating the mode determination process. Then, the system controller 13 proceeds to the step S903 or S907 in the shooting process in FIG. 9.

On the other hand, if it is determined that the composition intended by the user is not the vertical composition (NO to the step S1006), the system controller 13 determines that the composition intended by the user cannot be determined. Then, the system controller 13 sets the composition mode M to the value set in the immediately preceding determination again (step S1008: M=M). Then, the system controller 13 terminates the mode determination process, and proceeds to the step S903 or S907 in the shooting process in FIG. 9.

Figure 11:
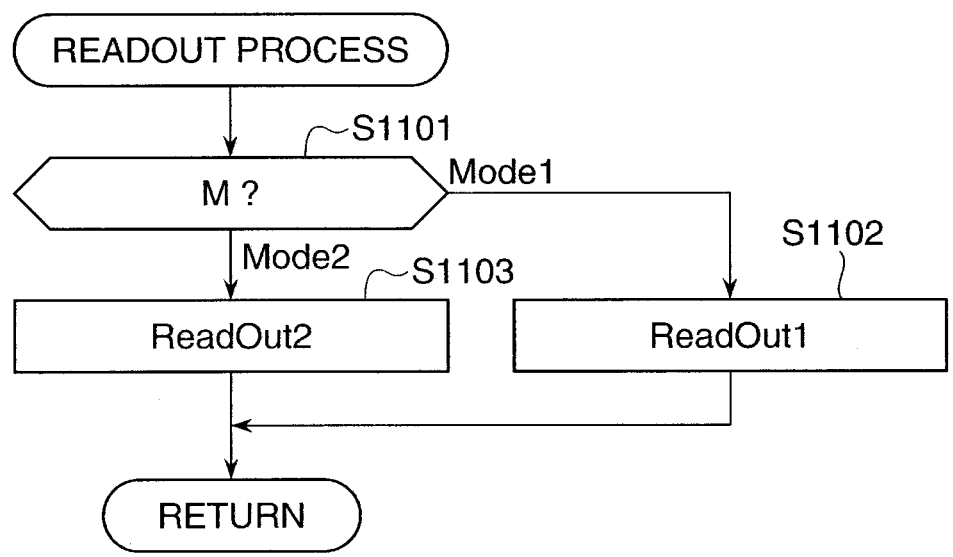
FIG. 11 is a flowchart of a readout process executed as a subroutine of the shooting process in FIG. 9.

FIG. 11 is a flowchart of the readout process executed as a subroutine in the step S908 in the shooting process in FIG. 9. Hereinafter, the reading process will be described with reference to FIGS. 1 and 11.

When the readout process is started, the system controller 13 determines whether the composition mode M is Mode 1 or Mode 2 (step S1101). If it is determined that the composition mode M is Mode 1 (Mode 1 in the step S1101), the system controller 13 sets the readout mode to Read Out 1, and performs signal reading from the solid-state image pickup device 3 (step S1102), followed by terminating the readout process. Then, the system controller 13 proceeds to the step S909 in the shooting process in FIG. 9.

On the other hand, if it is determined that the composition mode M is Mode 2 (Mode 2 in the step S1101), the system controller 13 sets the readout mode to Read Out 2, and performs signal reading from the solid-state image pickup device 3 (step S1103), followed by terminating the readout process. Then, the system controller 13 proceeds to the step S909 in the shooting process in FIG. 9.

Figure 12:
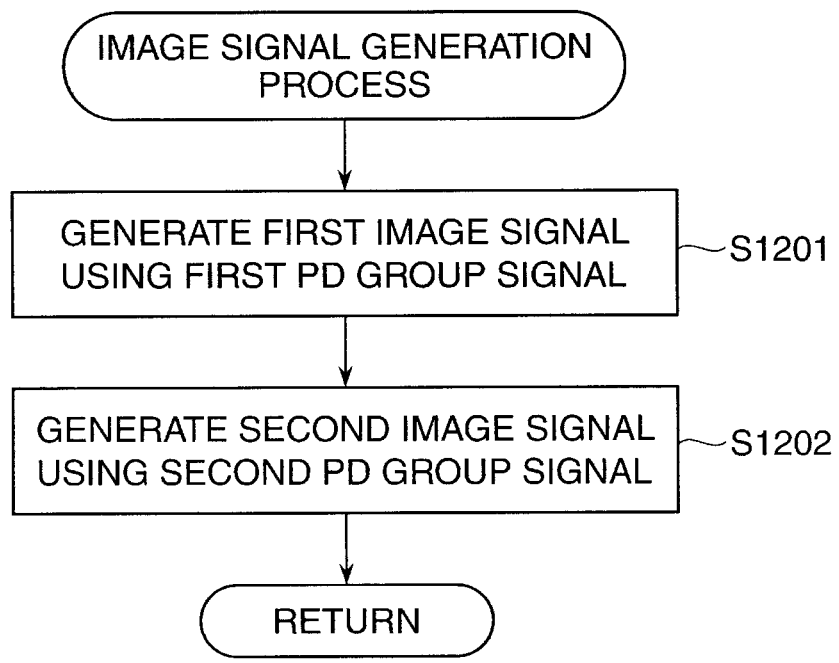
FIG. 12 is a flowchart of an image signal generation process executed as a subroutine of the shooting process in FIG. 9.

FIG. 12 is a flowchart of the image signal generation process executed as a subroutine in the step S909 in the shooting process in FIG. 9. Hereinafter, the image signal generation process will be described with reference to FIGS. 1 and 12.

The signal processing circuit 7 generates the first image signal according to the voltage signal obtained from the first PD group 31 under the control of the system controller 13 (step S1201). Then, the signal processing circuit 7 generates the second image signal according to the voltage signal obtained from the second PD group 32 under the control of the system controller 13 (step S1202), followed by terminating the image signal generation process. Then, the system controller 13 proceeds to the step S910 in the shooting process in FIG. 9.

Note that the step for generating the first image signal and the step for generating the second image signal may be executed in the inverse order, or may be simultaneously executed.

By operating the camera as described above, it is possible to generate images which can be viewed as a three-dimensional image in the composition intended by the user without a user's instruction or a user's operation.

In the above-described example, in the steps S902 and S906 in the FIG. 9 shooting process, the same mode determination process is executed. As a consequence, when the user attempts to shoot a still image during acquisition of a moving image, although the readout mode suitable for the horizontal posture of the camera is necessarily selected for the moving image, the readout mode most suitable for the composition intended by the user is selected for a still image.

Further, in the steps S902 and S906 in the FIG. 9 shooting process, the determination of whether an image to be acquired is a moving image or a still image may not be executed. As a consequence, for example, in a case where the image display unit 11 can display a moving image in the vertical composition, if a moving image acquired in the vertical composition is displayed in the vertical composition, it is possible to generate a moving image which can be viewed as a three-dimensional image.

Further, the FIG. 9 shooting process shown in FIG. 9 may be configured such that as a result of the mode determination process executed in the step S902, if the image to be acquired is a still image, the mode determination process is executed in the step S906, whereas if the image to be acquired is a moving image, the mode determination process in the step S906 is not executed. This makes it possible to simplify the process for acquiring a moving image.

Although in the above-described example, when $|\theta y|=|\theta x|$, it is determined that the composition intended by the user cannot be determined, and the result of the immediately preceding determination is used, the mode determination process may be configured such that the mode is necessarily determined to be one of the composition modes every time without using the result of the immediately preceding determination.

The mode determination process may be configured, for example, such that when $|\theta y| \geq |\theta x|$, the composition intended by the user is the horizontal composition to thereby eliminate a range in which the intended composition cannot be determined and the intended composition is necessarily determined to be one of the two compositions. In this case, it is unnecessary to set the composition mode to the initial value (step S901 in FIG. 9), determine whether or not the intended composition is the vertical composition (step S1006 in FIG. 10), and set the composition mode to the result of the immediate preceding determination (step S1008 in FIG. 10). In short, if it is determined in the step S1004 that the composition intended by the user is not the horizontal composition, the system controller 13 is only required to proceed to the step S1007.

Note that when the state of the release switch 18 is determined in the step S911 in the FIG. 9 shooting process, if the release switch 18 remains on, the system controller 13 may determine that there is no change in the composition because of continuous shooting. At this time, the system controller 13 may follow the result of the immediately preceding determination without performing mode determination during accumulation of charges for a next frame.

The shooting operation in this case will be described with reference to FIG. 13.

Figure 13:
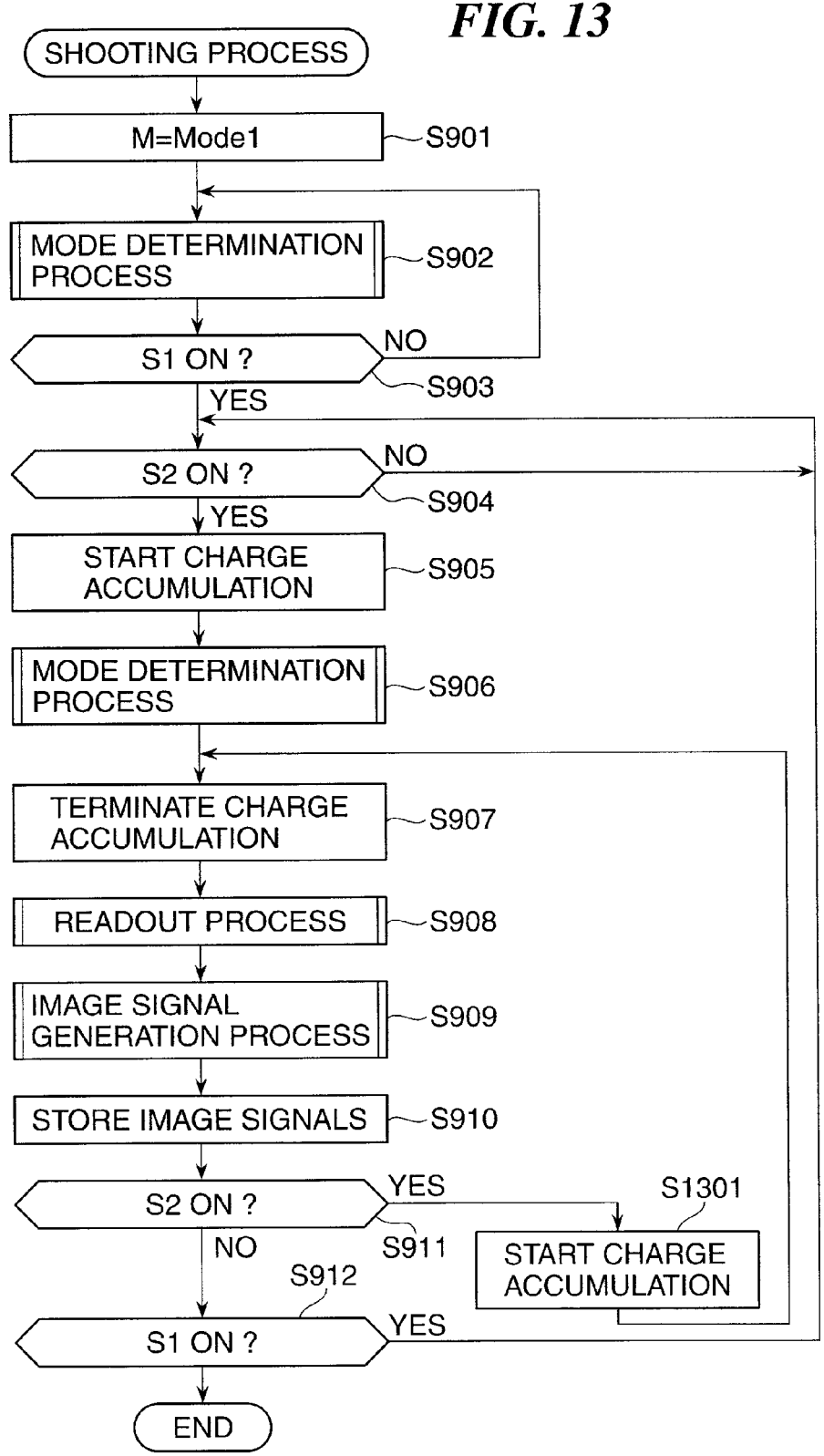
FIG. 13 is a flowchart of a variation of the shooting process executed by the camera as the image pickup apparatus shown in FIG. 1.

FIG. 13 is a flowchart of a variation of the shooting process executed by the camera as the image pickup apparatus shown in FIG. 1. Hereinafter, the this variation will be described with reference to FIGS. 1 and 13. In FIG. 13, the same steps as those described with reference to FIG. 9 are denoted by the same step numbers, and description thereof is omitted.

If it is determined in the step S911 that the release switch 18 remains on (YES to the step S911), the system controller 13 controls the drive circuit 6 to start accumulation of signal charges of the solid-state image pickup device 3 (step S1301). Then, the system controller 13 returns to the step S907.

By doing this, in continuous shooting, shooting is performed using the result of the immediately preceding determination without determining the composition during accumulation of charges for a next frame. This makes it possible to simplify the process during continuous shooting.

Hereinafter, a description will be given of other some variations of the camera as the image pickup apparatus according to the embodiment of the present invention. Note that the arrangement of the camera itself is the same as that shown in FIG. 1, and a shooting process is also the same as the shooting process shown in FIG. 9 except respective variations of the sub routines, described hereinbelow. First, a variation of the mode determination process will be described.

Figure 14:
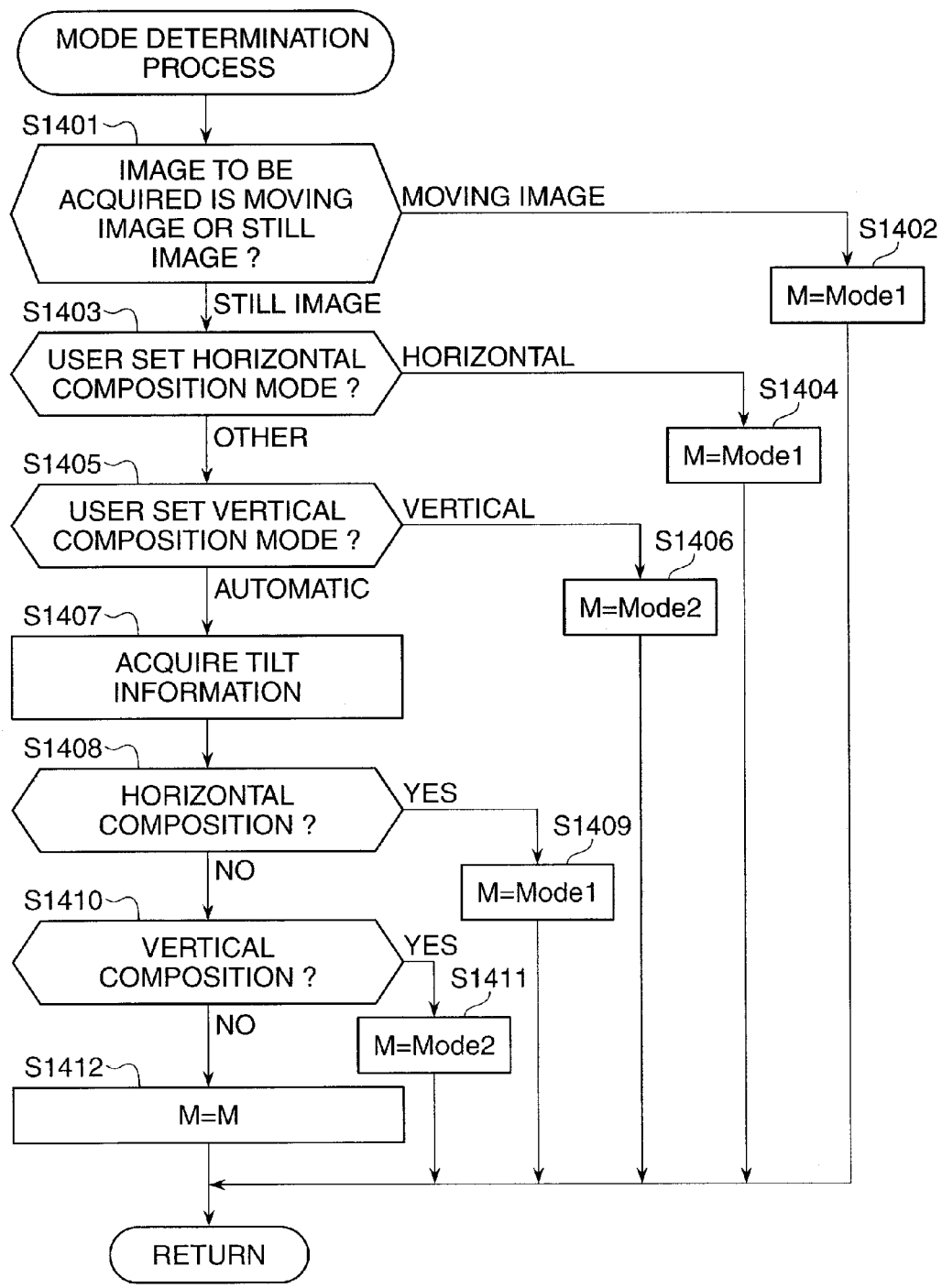
FIG. 14 is a flowchart of a variation of the mode determination process.

FIG. 14 is a flowchart of the variation of the mode determination process executed by the camera shown in FIG. 1. Hereinafter, this variation will be described with reference to FIGS. 1 and 14.

When the mode determination process is started, first, the system controller 13 determines whether an image to be acquired is a moving image or a still image (step S1401). If it is determined that an image to be acquired is a moving image (moving image in the step S1401), the system controller 13 sets the composition mode M to Mode 1 (step S1402), followed by terminating the mode determination process. Then, the system controller 13 proceeds to the step S903 or S907 in the shooting process in FIG. 9.

If it is determined that an image to be acquired is a still image (still image in the step S1401), the system controller 13 determines whether or not the composition mode set by the user is the horizontal composition mode (step S1403). If it is determined that the composition mode set by the user is the horizontal composition mode (horizontal in the step S1403), the system controller 13 sets the composition mode M to Mode 1 (step S1404), followed by terminating the mode determination process. Then, the system controller 13 proceeds to the step S903 or S907 in the shooting process in FIG. 9.

If it is determined that the composition mode set by the user is not the horizontal composition mode (other in the step S1403), the system controller 13 determines whether or not the composition mode set by the user is the vertical composition mode (step S1405).

If it is determined that the composition mode set by the user is the vertical composition mode (vertical in the step S1405), the system controller 13 sets the composition mode M to Mode 2 (step S1406), followed by terminating the mode determination process. Then, the system controller 13 proceeds to the step S903 or S907 in the shooting process in FIG. 9.

If it is determined that the composition mode set by the user is not the vertical composition mode (automatic in the step S1405), the system controller 13 determines that the composition mode set by the user is "the automatic setting mode". If the composition mode set by the user is "the automatic setting mode", the system controller 13 acquires tilt information indicative of the posture of the camera (step S1407).

Then, the system controller 13 determines whether or not the composition intended by the user is the horizontal composition according to the acquired tilt information (step S1408). If it is determined that the composition intended by the user is the horizontal composition (YES to the step S1408), the system controller 13 sets the composition mode M to Mode 1 (step S1409). Then, the system controller 13 proceeds to the step S903 or S907 in the shooting process in FIG. 9.

If it is determined that the composition intended by the user is not the horizontal composition (NO to the step S1408), the system controller 13 determines whether or not the composition intended by the user is the vertical composition (step S1410). If it is determined that the composition intended by the user is the vertical composition (YES to the step S1410), the system controller 13 sets the composition mode M to Mode 2 (step S1411), followed by terminating the mode determination process. Then, the system controller 13 proceeds to the step S903 or S907 in the shooting process in FIG. 9.

On the other hand, if it is determined that the composition intended by the user is not the vertical composition (NO to the step S1410), the system controller 13 determines that the composition intended by the user cannot be determined. Then, the system controller 13 sets the composition mode M to the value set in the immediately preceding determination again (step S1412: M=M). Then, the system controller 13 terminates the mode determination process, and proceeds to the step S903 or S907 in the shooting process in FIG. 9.

By executing the above-described mode determination process, it is possible to perform the shooting operation in the composition following the user's instruction, and if there is no instruction from the user, it is possible to perform shooting in a composition intended by the user, to thereby generate images which can be viewed as a three-dimensional image.

Next, a description will be given of another variation of the shooting process in FIG. 9 executed by the camera as the image pickup apparatus according to the embodiment of the present invention. In this variation, it is not necessary to execute the steps S901 and S902 in the FIG. 9 shooting process. Further, this variation differs from the FIG. 9 shooting process in the mode determination process and the readout process executed as the sub routines in the FIG. 9 shooting process.

By the way, as described hereinabove, in the case where the image pickup apparatus is tilted to the composition switching point, or in the case where the image pickup apparatus is turned up or down at right angles to the horizontal plane, it is determined that the intended composition cannot be determined, and the mode set based on the result of the immediately preceding mode determination is used.

In this variation, if it is determined that the intended composition cannot be determined, the system controller 13 displays, for example, a warning on the image display unit 11 to prompt the user to set the composition.

Figure 15:
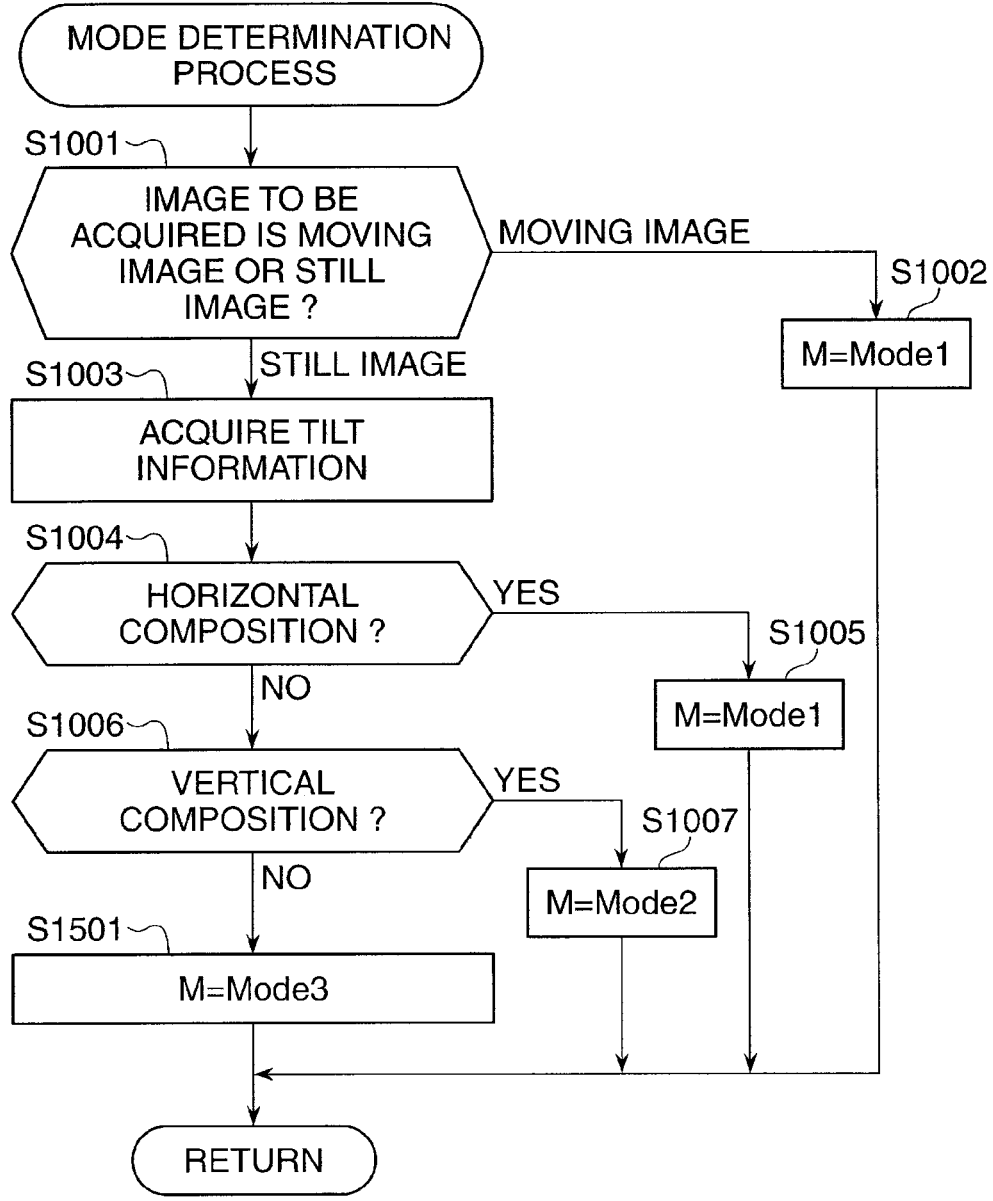
FIG. 15 is a flowchart of another variation of the mode determination process.

FIG. 15 is a flowchart of another variation of the mode determination process. Hereinafter, this variation will be described with reference to FIGS. 1 and 15. In FIG. 15, the same steps as those described with reference to FIG. 10 are denoted by the same step numbers, and description thereof is omitted.

If it is determined in the step S1006 that the composition intended by the user is not the vertical composition (NO to the step S1006), the system controller 13 sets the composition mode M to Mode 3 for prompting the user to set the composition (step S1501). Then, the system controller 13 terminates the mode determination process.

Figure 16:
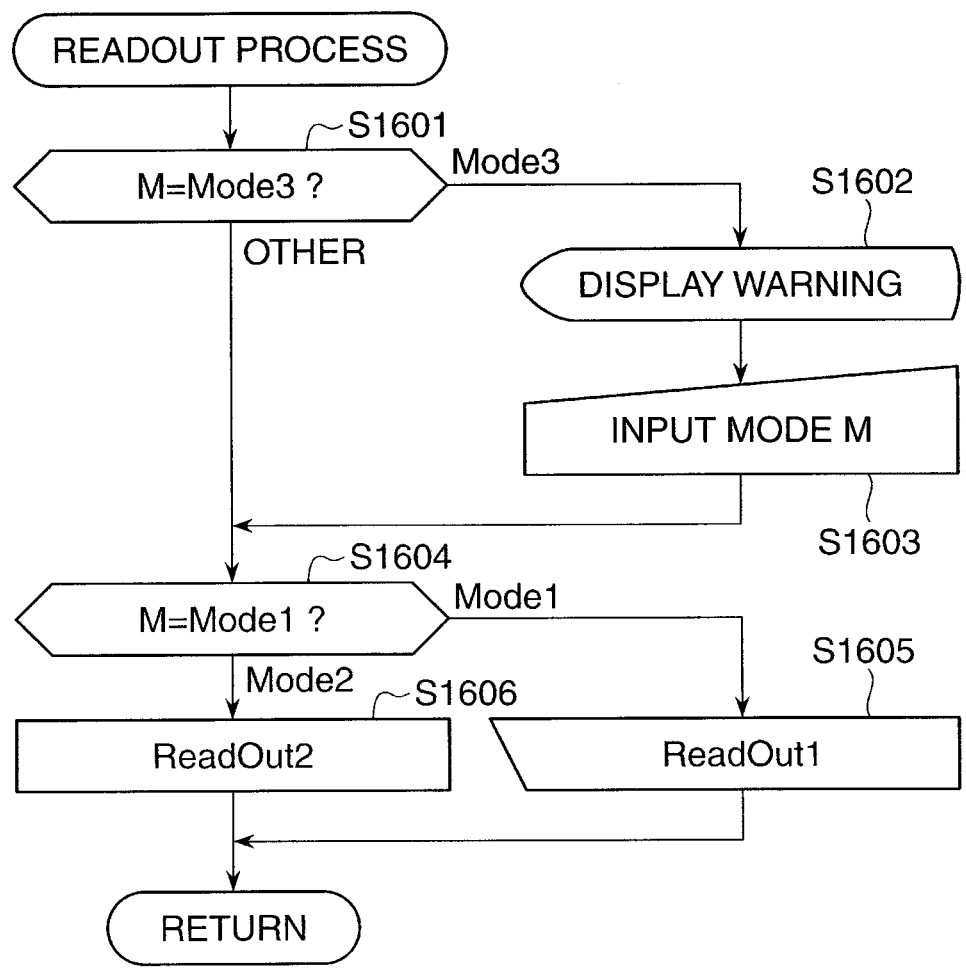
FIG. 16 is a flowchart of a variation of the readout process.

FIG. 16 is a flowchart of a variation of the readout process. Hereinafter, the readout process will be described with reference to FIGS. 1 and 16.

When the readout process is started, the system controller 13 determines whether or not the composition mode M is Mode 3 (step S1601). If it is determined that the composition mode M is Mode 3 (Mode 3 in the step S1601), the system controller 13 displays a warning for selecting the composition on the image display unit 11 to thereby prompt the user to select the composition (step S1602).

When the user inputs the composition mode M indicative of the horizontal composition or the vertical composition in response to the warning (step S1603), the system controller 13 determines whether or not the input composition mode M is Mode 1 (step S1604). If the input composition mode M is Mode 1 (Mode 1 in the step S1604), the system controller 13 sets the readout mode to Read Out 1, and performs signal reading from the solid-state image pickup device 3 (step S1605), followed by terminating the readout process. Then, the system controller 13 proceeds to the step S909 in the shooting process in FIG. 9.

On the other hand, if it is determined that the input composition mode M is Mode 2 (Mode 2 in the step S1604), the system controller 13 sets the readout mode to Read Out 2, and performs signal reading from the solid-state image pickup device 3 (step S1606), followed by terminating the readout process. Then, the system controller 13 proceeds to the step S909 in the shooting process in FIG. 9.

If it is determined in the step S1601 that the composition mode M is not Mode 3 (other than Mode 3 in the step S1601), the system controller 13 proceeds to the step S1604.

By operating the camera as described above, it is possible to prompt the user to designate the composition in a situation where which the intended composition cannot be automatically determined, whereby it is possible to generate images which can be viewed as a three-dimensional image in the composition designated by the user.

As described above, in the present embodiment, the outputs from the photo diodes PD of each unit pixel are processed such that the first image signal and the second image signal have parallax selectively in the X-axis direction or the Y-axis direction.

By the way, the first image signal and the second image signal can have parallax not only in the X-axis direction or the Y-axis direction, but also in any of various directions according to selection (combinations) of photo diodes PD used for generation of the first image signal and the second image signal.

As shown in FIG. 2C, in the case of the unit pixel having four photo diodes PD arranged in 2×2 matrix, for example, if the first image signal is generated using the output from the photo diode PD (0, 0), and the second image signal is generated using the output from the photo diode PD (1, 1), it is possible to set parallax in a direction inclined from the X-axis by 45°.

On the other hand, if the first image signal is generated using the output from the photo diode PD (1, 0) and the second image signal is generated using the output from the photo diode PD (0, 1), it is possible to set parallax in a direction inclined from the X-axis by −45°.

For example, photo diodes PD are selected according to the angle of tilt of the camera from the horizontal level such that the first and second image signals have parallax in a direction closest to parallel to the horizontal plane. As a consequence, in a case where an image shot by the camera in an tilted state does not have a proper horizontal, it is possible to set parallax in a direction which becomes optimal when the image is rotated later such that it has a proper horizontal.

In this case, it is preferable to provide a lot of photo diodes in the unit pixel of the solid-state image pickup device 3.

Figure 17:
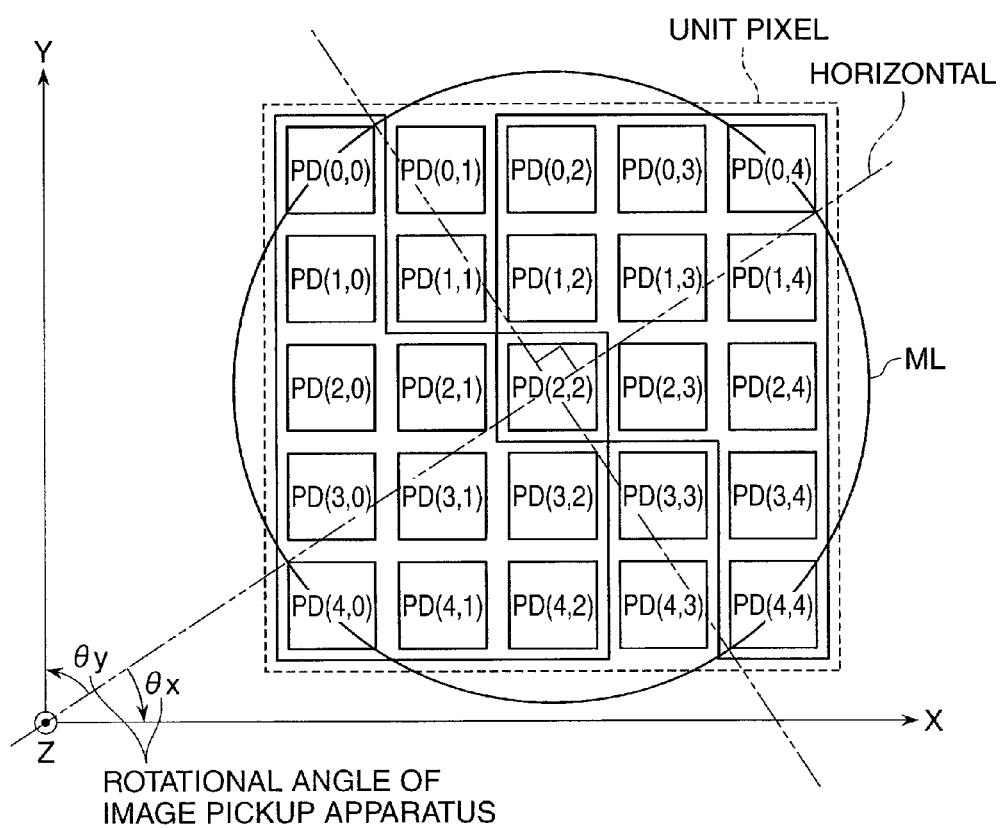
FIG. 17 is a diagram of a variation of a unit pixel of the solid-state image pickup device used in the camera as the image pickup apparatus shown in FIG. 1, which includes a number of photo diodes.

FIG. 17 is a diagram of a variation of a unit pixel of the solid-state image pickup device 3 used in the camera as the image pickup apparatus shown in FIG. 1, which includes a number of photo diodes.

As shown in FIG. 17, as the unit pixel has more photo diodes PD (0, 0) to PD (4, 4), it is possible to freely select photo diodes PD to be selected for generation of the first and second image signals. Therefore, it is possible to finely adjust the direction of parallax set between the two images.

As is clear from the above description, in FIG. 1, the system controller 13 and the mode determination section 19 function as a determination unit. Further, the system controller 13 and the drive circuit 6 function as a grouping unit. Further, the signal processing circuit 7 functions as a generation unit. Further, system controller 13 and the display circuit 12 function as a display control unit.

Although the description has been given of the embodiment of the present invention, the present invention is not limited to the above-described embodiment, but it can be practiced in various forms, without departing from the spirit and scope thereof.

For example, the functions of the above-described embodiment may be configured as a control method, and the control method may be executed by the image pickup apparatus. Further, a control program having the functions of the above-described embodiment may be executed by a computer included in the image pickup apparatus.

In doing this, the control method and program have at least a composition determination step, a grouping step, and a generation step. Note that the control program is recorded e.g. in a computer-readable storage medium.

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

REFERENCE SIGNS LIST 3 solid-state image pickup device
6 drive circuit
7 signal processing circuit
9 image storage medium
11 image display unit
13 system controller
19 mode determination section
PD photo diode
ML micro lens

The invention claimed is:

1. An image pickup apparatus that has an image pickup device for converting an optical image to an electric signal, the image pickup device including a plurality of unit pixels, each of which has a plurality of photoelectric conversion elements, comprising:
   a determination unit configured to determine a posture of the image pickup apparatus;
   a selecting unit configured to select pairs of the photoelectric conversion elements in each unit pixel according to a result of determination by said determination unit; and
   a generation unit configured to generate a plurality of image signals for displaying images from electric signals output from the selected pairs of the photoelectric conversion elements in each unit pixel.

2. The image pickup apparatus according to claim 1, wherein said determination unit includes a tilt detecting unit configured to obtain tilt information by detecting tilt of the image pickup apparatus with respect to a horizontal plane, and
   wherein said determination unit determines the posture of the image pickup apparatus according to the tilt information.

3. The image pickup apparatus according to claim 2, wherein the image pickup device has a rectangular shape having a long side and a short side, and wherein said determination unit determines the posture of the image pickup apparatus according to a first angle formed between the long side of the image pickup device and the horizontal plane and a second angle formed between the short side of the image pickup device and the horizontal plane.

4. The image pickup apparatus according to claim 3, wherein the unit pixels are arranged in a two-dimensional matrix, and further, the plurality of photoelectric conversion elements are arranged in a two-dimensional matrix in each unit pixel, wherein said determination unit determines that the posture of the image pickup apparatus is a horizontal posture in a case where the first angle is smaller than the second angle, and determines that the posture of the image pickup apparatus is a vertical posture in a case where the first angle is larger than the second angle, and wherein in a case where it is determined by said determination unit that the posture of the image pickup apparatus is the horizontal posture, said grouping unit groups ones of the plurality of photoelectric conversion elements, which are arranged parallel to the short side, into one group as the photoelectric conversion element group, whereas in a case where it is determined by said determination unit that the posture of the image pickup apparatus is the vertical posture, said grouping unit groups ones of the plurality of photoelectric conversion elements, which are arranged parallel to the long side, into one group as the photoelectric conversion element group.

5. The image pickup apparatus according to claim 4, including a setting unit for a user to set one of the horizontal posture and the vertical posture, wherein said selecting unit performs the selecting according to setting by the user regardless of the result of determination of the posture of the image pickup apparatus by said determination unit.

6. The image pickup apparatus according to claim 5, including a display control unit configured to be operable in a case where determination by said determination unit cannot be performed, to display a message to the effect that determination cannot be performed on a display section to thereby prompt the user to perform setting.

7. The image pickup apparatus according to claim 1, wherein each of the unit pixels includes a micro lens.

8. A method of controlling an image pickup apparatus that has an image pickup device for converting an optical image to an electric signal, the image pickup device including a plurality of unit pixels, each of which has a plurality of photoelectric conversion elements, comprising:

determining a posture of the image pickup apparatus;

selecting pairs of the photoelectric conversion elements in each unit pixel according to a result of said determining; and generating a plurality of image signals for displaying images from electric signals output from the selected pairs of the photoelectric conversion elements in each unit pixel.

9. The method according to claim 8, wherein each of the unit pixels includes a micro lens.

10. A non-transitory computer-readable storage medium storing a computer-executable program for causing a computer included in an image pickup apparatus to execute a method of controlling the image pickup apparatus that has an image pickup device for converting an optical image to an electric signal, the image pickup device including a plurality of unit pixels, each of which has a plurality of photoelectric conversion elements, wherein the method comprises:

determining a posture of the image pickup apparatus;

selecting pairs of the photoelectric conversion elements in each unit pixel according to a result of said determining; and generating a plurality of image signals for displaying images from electric signals output from the selected pairs of the photoelectric conversion elements in each unit pixel.

11. The non-transitory computer-readable storage medium according to claim 10, wherein each of the unit pixels includes a micro lens.

* * * * *